(12) United States Patent
Neubauer et al.

(10) Patent No.: US 11,763,683 B2
(45) Date of Patent: Sep. 19, 2023

(54) APPARATUS AND METHOD FOR GUIDING UNMANNED AERIAL VEHICLES

(71) Applicant: Dimetor GmbH, Altenberg bei Linz (AT)

(72) Inventors: Thomas Neubauer, Altenberg bei Linz (AT); Thomas Wana, Vienna (AT)

(73) Assignee: Dimetor GmbH, Altenberg bei Linz (AT)

( * ) Notice: Subject to any disclaimer, the term of this patent is extended or adjusted under 35 U.S.C. 154(b) by 202 days.

(21) Appl. No.: 16/900,114

(22) Filed: Jun. 12, 2020

(65) Prior Publication Data
US 2020/0394928 A1    Dec. 17, 2020

(30) Foreign Application Priority Data

Jun. 14, 2019    (EP) .................................... 19180368
Jun. 14, 2019    (EP) .................................... 19180372

(Continued)

(51) Int. Cl.
*G08G 5/00*    (2006.01)
*H04W 4/40*    (2018.01)
(Continued)

(52) U.S. Cl.
CPC ............ *G08G 5/0013* (2013.01); *G06N 20/00* (2019.01); *G08G 5/0069* (2013.01);
(Continued)

(58) Field of Classification Search
CPC ........ B64C 2201/027; B64C 2201/127; B64C 2201/128; B64C 2201/145;
(Continued)

(56) References Cited

U.S. PATENT DOCUMENTS 7,953,372 B2    5/2011    Ofek et al.
8,184,594 B2    5/2012    Li et al.
(Continued)

FOREIGN PATENT DOCUMENTS

AU    2016368552 B2    6/2017
WO    2011134286 A1    11/2011
(Continued)

OTHER PUBLICATIONS

Hazim Shakhatreh, et al. "Unmanned Aerial Vehicles (UAVs): A Survey on Civil Applications and Key Research Challenges", IEEE Access, vol. 7, Apr. 9, 2019, pp. 48572-48634, XP011720255, DOI: 10.1109/ACCESS.2019.2909530.
(Continued)

*Primary Examiner* — Khoa Huynh
(74) *Attorney, Agent, or Firm* — THE WEBB LAW FIRM

(57) ABSTRACT

The present disclosure provides an apparatus and a method for computing data for guiding unmanned aerial vehicles (UAVs) in a three-dimensional (3D) air space. Stored network data including location data of network nodes as well as current network data including current connectivity data of the network nodes are acquired. By correlating the stored and current network data, current 3D coverage data indicating current network coverage along three dimensions in the 3D flight area (e.g. a handover probability or an interference caused by a UAV) are determined. The techniques of the present disclosure enable modeling and predicting a current coverage and connectivity state of 3D air space and facilitates control and operation of UAV air traffic.

20 Claims, 4 Drawing Sheets

(30) Foreign Application Priority Data

Jun. 14, 2019 (EP) .................................... 19180378
Jun. 9, 2020 (EP) .................................... 20179032

(51) Int. Cl.
*H04W 36/00* (2009.01)
*G06N 20/00* (2019.01)
*H04B 7/185* (2006.01)
*H04W 36/32* (2009.01)

(52) U.S. Cl.
CPC .......... *H04B 7/18506* (2013.01); *H04W 4/40* (2018.02); *H04W 36/0061* (2013.01); *H04W 36/00837* (2018.08); *H04W 36/008375* (2023.05); *H04W 36/32* (2013.01)

(58) Field of Classification Search
CPC ....................... B64C 2201/146; B64C 39/024; G06N 20/00; G08G 5/0013; G08G 5/0069; H04B 7/18506; H04W 4/40; H04W 36/0061; H04W 36/00837; H04W 36/245; H04W 36/32; H04W 36/008375
See application file for complete search history.

(56) References Cited

U.S. PATENT DOCUMENTS

| | | | |
|---|---|---|---|
| 9,363,690 | B1 | 6/2016 | Singh et al. |
| 9,818,303 | B2 | 11/2017 | Kotecha |
| 10,438,494 | B1 | 10/2019 | Hahn |
| 2014/0226584 | A1 | 8/2014 | Cullen et al. |
| 2015/0336667 | A1 | 11/2015 | Srivastava et al. |
| 2016/0300493 | A1 | 10/2016 | Ubhi et al. |
| 2016/0328980 | A1 | 11/2016 | Sharma et al. |
| 2016/0371985 | A1* | 12/2016 | Kotecha ............... G01C 21/005 |
| 2017/0069214 | A1 | 3/2017 | Dupray et al. |
| 2017/0164257 | A1 | 6/2017 | Ross et al. |
| 2017/0208512 | A1 | 7/2017 | Aydin et al. |
| 2017/0278409 | A1* | 9/2017 | Johnson ............... G08G 5/0013 |
| 2018/0038695 | A1 | 2/2018 | Bitra et al. |
| 2018/0293897 | A1 | 10/2018 | Murphy |
| 2018/0375568 | A1 | 12/2018 | De Rosa et al. |
| 2019/0044609 | A1 | 2/2019 | Winkle et al. |
| 2019/0230606 | A1* | 7/2019 | Ryu ..................... H04W 52/367 |
| 2020/0195521 | A1* | 6/2020 | Bogineni ............. H04W 36/28 |
| 2020/0266903 | A1* | 8/2020 | De Rosa ............ H04B 7/18506 |
| 2021/0325906 | A1 | 10/2021 | White |
| 2021/0325907 | A1 | 10/2021 | White |
| 2022/0069876 | A1* | 3/2022 | Xue ..................... B64C 39/024 |

FOREIGN PATENT DOCUMENTS

| | | |
|---|---|---|
| WO | 2015114572 A1 | 8/2015 |
| WO | 2018013234 A1 | 1/2018 |
| WO | 2018086140 A1 | 5/2018 |

OTHER PUBLICATIONS

Lin et al., "The Sky Is Not the Limit: LTE for Unmanned Aerial Vehicles", IEEE Communications Magazine, 2018, pp. 204-210, vol. 56, No. 4.

Lin et al., "Prototype Hierarchical UAS Traffic Management System in Taiwan", IEEE Integrated Communications, Navigation, and Surveillance Conference, 2019, pp. 1-13.

"UAS ATM Cars Common Altitude Reference System Discussion Document", European Organisation for the Safety of the Air Navigation (EUROCONTROL), 2018, 27 pages, Edition 1.0, retrieved from https://www.eurocontrol.int/sites/default/files/2019-05/uas-atm-cars-v1.0-release-20181127_0.pdf.

"Fact Sheet—Small Unmanned Aircraft Regulations (Part 107)", Federal Aviation Administration, 2016, 3 pages, retrieved from https://www.faa.gov/news/fact_sheets/news_story.cfm?newsId=20516.

"Product Overview", Infovista, 2020, retrieved from https://www.infovista.com/planet/rf-planning-optimization.

"Geodata for RF Planning and Optimization", LuxCarta, 2018, retrieved from https://luxcarta.com/product/geodata-for-rf-planning-and-optimization/.

"Geospatial Products for RF Planning and Optimization", LuxCarta, 2018, retrieved from https://luxcarta.com/resources/LuxCarta_RFPlanning&Optimization_2018_web.pdf.

"Radio Planning", TEOCO, 2020, accessed Jun. 11, 2020, retrieved from https://www.teoco.com/products/planning-optimization/asset-radio-planning/.

"Digital Maps, Radio Frequency (RF) Map, RF Planning", Visicom, 2020, retrieved from https://visicomdata.com/.

* cited by examiner

APPARATUS AND METHOD FOR GUIDING UNMANNED AERIAL VEHICLES

CROSS-REFERENCE TO RELATED APPLICATIONS

This application claims priority to European Patent Application Nos. 19180372.5, 19180368.3, and 19180378.2, all filed Jun. 14, 2019, and European Patent Application No. 20179032.6 filed Jun. 9, 2020, the disclosures of which are hereby incorporated by reference in their entireties.

BACKGROUND

1. Technical Field

The present disclosure relates to the technical field of wireless communication for air traffic control.

2. Description of Related Art

The operation of unmanned aerial vehicles (UAVs) requires permanent monitoring and control of the position and moving direction of the unmanned aerial vehicle during a flight along a flight path in three-dimensional air space, in order to provide for sufficient safety during operation. In particular, beyond visual line of sight (BLVOS) operation of UAVs imposes new requirements on air traffic control.

SUMMARY

The present disclosure is directed at facilitating air traffic management, in particular for unmanned aerial vehicles in beyond-line-of sight applications and controlled via wireless communication, by providing three-dimensional (3D) network coverage data representing a current state of the network.

The scope of the invention is defined by the independent claims.

Provided is an apparatus for computing data for guiding an unmanned aerial vehicle, UAV, in a three-dimensional, 3D, flight area within airspace, comprising a first interface configured for acquiring, from a data storage, stored network data including location data of network nodes of a wireless communication network within the flight area, a second interface configured for acquiring current network data including current connectivity data of the network nodes, and circuitry configured for computing current 3D coverage data indicating current network coverage along three dimensions in the 3D flight area by correlating the stored network data and the current network data, wherein the current 3D coverage data include an indication of a handover probability of handover by the UAV from one network node to another network node.

Accordingly, determination of a current state of network connectivity and coverage is facilitated, for enhancing safety in UAV operation, and the risk of connection loss due to handover may be alleviated.

In some embodiments, the apparatus comprises an output interface configured for automatically reporting the current 3D coverage data to an aviation control node for granting an air traffic control clearance for the UAV in the flight area or for performing control of the UAV.

For instance, the second interface is configured for receiving event data indicating known future network events known to occur at the network nodes at a time later than receiving the event data.

For example, the current connectivity data include at least one of a current state of a network node out of an ON state and an OFF state; fault network data, and a workload indicating a number of mobile terminals currently connected to one or more of the network nodes, and/or the traffic transmitted/received at one or more of the network nodes, and the guiding of the UAV includes deviating from a previously determined flight path based on a change in network connectivity indicated by the current connectivity data.

Accordingly, the present disclosure allows for a prompt adaptation of UAV operation including flight paths to a current state of the network by taking into account possible changes in the connectivity with low latency.

For example, the current network data include results of connectivity measurements performed by the UAV or a communication terminal different from the UAV.

Accordingly, validation and calibration of the 3D coverage computing process is facilitated by providing current measurements.

In some embodiments, the circuitry is configured to calculate a position of the UAV based on the results of the connectivity measurements performed by the UAV or based on a connectivity measurement of the connectivity of the UAV performed by the network.

This may facilitate providing redundant information on the position of UAVs to allow for safe and efficient guidance of the UAVs.

In some embodiments, the current 3D coverage data indicate an interference caused by the UAV.

This may facilitate optimizing network performance for UAVs and for other communication terminals served by a wireless network.

For instance, the current network data include an indication of a current number, or aggregated number over a period of time, of communication terminals per area unit, and the output interface reports that number of communication terminals per area to the aviation control node.

Accordingly, flight paths for UAVs can be planned so as to avoid flying above areas where many humans are currently present.

For instance, the current 3D coverage data include a signal power.

For example, the handover probability depends on at least one of the moving speed and the moving direction of the UAV.

In some embodiments, the stored network data and the current network data include data of a plurality of wireless communication networks.

Accordingly, a redundancy in connectivity, as provided by plurality of communication networks may be utilized for maintaining a connected state of a UAV.

For instance, the three-dimensional flight area is subdivided into a plurality of sub-areas, and the circuitry is configured for computing the current 3D coverage data respectively for the plurality of sub-areas.

This facilitates precise efficient processing of a current 3D coverage as well as determination of a current network coverage, for instance when a different number of connectivity measurements are available in different regions of the flight area.

For example, the circuitry is configured for computing the current 3D coverage data based on a model for predicting 3D coverage, and the model is generated based on the stored network data and automatically updated based on the current network data.

In some embodiments, the model is updated by machine learning.

Further provided is a method for computing data for guiding unmanned aerial vehicles, UAVs, in a three-dimensional, 3D, flight area within airspace, comprising acquiring, from a data storage, stored network data including location data of network nodes of a wireless communication network within the flight area, acquiring current network data including current connectivity data of the network nodes; and computing current 3D coverage data indicating current network coverage along three dimensions in the three-dimensional flight area by correlating the stored network data and the current network data, wherein the current 3D coverage data include an indication of a handover probability of handover by the UAV from one network node to another network node.

Accordingly, determination of a current state of network connectivity and coverage is facilitated, for enhancing safety in UAV operation, and the risk of connection loss due to handover may be alleviated.

In some embodiments, the method comprises automatically reporting the current 3D coverage data to an aviation control node for granting an air traffic control clearance for the UAV in the flight area or for performing control of the UAV.

For instance, the method comprises receiving event data indicating known future network events known to occur at the network nodes at a time later than receiving the event data.

For example, the current connectivity data include at least one of a current state of a network node out of an ON state and an OFF state; fault network data, and a workload indicating a number of mobile terminals currently connected to one or more of the network nodes, and/or the traffic transmitted/received at one or more of the network nodes, and the guiding of the UAV includes deviating from a previously determined flight path based on a change in network connectivity indicated by the current connectivity data.

Accordingly, the present disclosure allows for a prompt adaptation of UAV operation including flight paths to a current state of the network by taking into account possible changes in the connectivity with low latency.

In some embodiments, the current network data include results of connectivity measurements performed by the UAV or a communication terminal different from the UAV.

Accordingly, validation and calibration of the 3D coverage computing process is facilitated by providing current measurements.

In some embodiments, the method includes calculating a position of the UAV based on the results of the connectivity measurements performed by the UAV or based on a connectivity measurement of the connectivity of the UAV performed by the network.

This may facilitate providing redundant information on the position of UAVs to allow for safe and efficient guidance of the UAVs.

In some embodiments, the current 3D coverage data indicate an interference caused by the UAV.

This facilitates optimizing network performance for UAVs and for other communication terminals served by a wireless network.

For example, the current network data include an indication of a current number, or aggregated number over a period of time, of communication terminals per area unit, and the output interface reports that number of communication terminals per area to the aviation control node.

Accordingly, flight paths for UAVs can be planned so as to avoid flying above areas where many humans are currently present.

For instance, the current 3D coverage data include a signal power.

For example, the handover probability depends on at least one of the moving speed and the moving direction of the UAV.

In some embodiments, the stored network data and the current network data include data of a plurality of wireless communication networks.

Further is an apparatus for computing data for guiding an unmanned aerial vehicle, UAV, in a three-dimensional, 3D, flight area within airspace, comprising a first interface configured for acquiring, from a data storage, stored network data including location data of network nodes of a wireless communication network within the flight area, a second interface configured for acquiring current network data including current connectivity data of the network nodes, and circuitry configured for computing current 3D coverage data indicating current network coverage along three dimensions in the 3D flight area by correlating the stored network data and the current network data, the 3D coverage data including an interference caused by the UAV.

Accordingly, determination of a current state of network connectivity and coverage is facilitated, for enhancing safety in UAV operation and optimizing network performance for UAVs and for other communication terminals served by a wireless network.

In some embodiments, the apparatus comprises an output interface configured for automatically reporting the current 3D coverage data to an aviation control node for granting an air traffic control clearance for the UAV in the flight area or for performing control of the UAV.

For instance, the second interface is configured for receiving event data indicating known future network events known to occur at the network nodes at a time later than receiving the event data.

For example, the current connectivity data include at least one of a current state of a network node out of an ON state and an OFF state; fault network data, and a workload, and the guiding of the UAV includes deviating from a previously determined flight path based on a change in network connectivity indicated by the current connectivity data.

E.g., the workload indicates a number of mobile terminals currently connected to one or more of the network nodes, and/or the traffic transmitted/received at one or more of the network nodes.

Accordingly, the present disclosure allows for a prompt adaptation of UAV operation including flight paths to a current state of the network by taking into account possible changes in the connectivity with low latency.

For example, the current network data include results of connectivity measurements performed by the UAV or a communication terminal different from the UAV.

Accordingly, validation and calibration of the 3D coverage computing process is facilitated by providing current measurements.

In some embodiments, the circuitry is configured to calculate a position of the UAV based on the results of the connectivity measurements performed by the UAV or based on a connectivity measurement of the connectivity of the UAV performed by the network.

This may facilitate providing redundant information on the position of UAVs to allow for safe and efficient guidance of the UAVs.

For instance, the current network data include an indication of a current number, or aggregated number over a period of time, of communication terminals per area unit, and the output interface reports that number of communication terminals per area to the aviation control node.

Accordingly, flight paths for UAVs can be planned so as to avoid flying above areas where many humans are currently present.

For instance, the current 3D coverage data include a signal power.

In some embodiments, the current 3D coverage data include an indication of a handover probability of handover by the UAV from one network node to another network node.

This facilitates alleviating the risk of connection loss due to handover.

For example, the handover probability depends on at least one of the moving speed and the moving direction of the UAV.

In some embodiments, the stored network data and the current network data include data of a plurality of wireless communication networks.

Accordingly, a redundancy in connectivity, as provided by plurality of communication networks may be utilized for maintaining a connected state of a UAV.

For instance, the three-dimensional flight area is subdivided into a plurality of sub-areas, and the circuitry is configured for computing the current 3D coverage data respectively for the plurality of sub-areas.

This facilitates precise efficient processing of a current 3D coverage as well as determination of a current network coverage, for instance when a different number of connectivity measurements are available in different regions of the flight area.

For example, the circuitry is configured for computing the current 3D coverage data based on a model for predicting 3D coverage, and the model is generated based on the stored network data and automatically updated based on the current network data.

In some embodiments, the model is updated by machine learning.

Further provided is a method for computing data for guiding unmanned aerial vehicles, UAVs, in a three-dimensional, 3D, flight area within airspace, comprising acquiring, from a data storage, stored network data including location data of network nodes of a wireless communication network within the flight area, acquiring current network data including current connectivity data of the network nodes; and computing current 3D coverage data indicating current network coverage along three dimensions in the three-dimensional flight area by correlating the stored network data and the current network data, the 3D coverage data including an interference caused by the UAV.

Accordingly, determination of a current state of network connectivity and coverage is facilitated, for enhancing safety in UAV operation and for optimizing network performance for UAVs and for other communication terminals served by a wireless network.

In some embodiments, the method comprises automatically reporting the current 3D coverage data to an aviation control node for granting an air traffic control clearance for the UAV in the flight area or for performing control of the UAV.

For instance, the method comprises receiving event data indicating known future network events known to occur at the network nodes at a time later than receiving the event data.

For example, the current connectivity data include at least one of a current state of a network node out of an ON state and an OFF state; fault network data, and a workload, and the guiding of the UAV includes deviating from a previously determined flight path based on a change in network connectivity indicated by the current connectivity data.

E.g., the workload indicates a number of mobile terminals currently connected to one or more of the network nodes, and/or the traffic transmitted/received at one or more of the network nodes.

Accordingly, the present disclosure allows for a prompt adaptation of UAV operation including flight paths to a current state of the network by taking into account possible changes in the connectivity with low latency.

In some embodiments, the current network data include results of connectivity measurements performed by the UAV or a communication terminal different from the UAV.

Accordingly, validation and calibration of the 3D coverage computing process is facilitated by providing current measurements.

In some embodiments, the method includes calculating a position of the UAV based on the results of the connectivity measurements performed by the UAV or based on a connectivity measurement of the connectivity of the UAV performed by the network.

This may facilitate providing redundant information on the position of UAVs to allow for safe and efficient guidance of the UAVs.

For example, the current network data include an indication of a current number, or aggregated number over a period of time, of communication terminals per area unit, and the output interface reports that number of communication terminals per area to the aviation control node.

Accordingly, flight paths for UAVs can be planned so as to avoid flying above areas where many humans are currently present.

For instance, the current 3D coverage data include a signal power.

In some embodiments, the current 3D coverage data include an indication of a handover probability of handover by the UAV from one network node to another network node.

This facilitates alleviating the risk of connection loss due to handover.

For example, the handover probability depends on at least one of the moving speed and the moving direction of the UAV.

In some embodiments, the stored network data and the current network data include data of a plurality of wireless communication networks.

Accordingly, a redundancy in connectivity, as provided by plurality of communication networks may be utilized for maintaining a connected state of a UAV.

For instance, the three-dimensional flight area is subdivided into a plurality of sub-areas, and the method comprises computing the current 3D coverage data respectively for the plurality of sub-areas.

This facilitates precise efficient processing of a current 3D coverage as well as determination of a current network coverage, for instance when a different number of connectivity measurements are available in different regions of the flight area.

For example, the method comprises computing the current 3D coverage data based on a model for predicting 3D coverage, and the model is generated based on the stored network data and automatically updated based on the current network data.

In some embodiments, the model is updated by machine learning.

Further provided is an aviation control node for guiding an unmanned aerial vehicle, UAV, in a three-dimensional, 3D, flight area within airspace, comprising an input interface configured for acquiring current 3D coverage data indicating current network coverage along three dimensions in the three-dimensional flight area, the 3D coverage data being determined by correlating stored network data including location data of network nodes of a wireless communication network and current network data including current connectivity data of the network nodes, and circuitry configured for performing the guiding of the UAV based on the current 3D coverage data, wherein the guiding of the UAV includes determining at least one of a flight path or a flight corridor including the flight path by minimizing a cost function including at least an interference caused by the UAV.

This facilitates making efficient decisions, enhancing safety in UAV guidance, and optimizing network performance for UAVs and for other communication terminals served by a wireless network.

Also provided is an aviation control method for guiding an unmanned aerial vehicle, UAV, in a three-dimensional, 3D, flight area within airspace, comprising acquiring current 3D coverage data indicating current network coverage along three dimensions in the three-dimensional flight area, the 3D coverage data being determined by correlating stored network data including location data of network nodes of a wireless communication network and current network data including current connectivity data of the network nodes, and performing the guiding of the UAV based on the current 3D coverage data, wherein the guiding of the UAV includes determining at least one of a flight path or a flight corridor including the flight path by minimizing a cost function including at least an interference caused by the UAV.

This facilitates making efficient decisions, enhancing safety in UAV guidance, and optimizing network performance for UAVs and for other communication terminals served by a wireless network.

Also provided a computer program comprising instructions which, when the program is executed by a computer, cause the computer to carry out the steps of acquiring, from a data storage, stored network data including location data of network nodes of a wireless communication network within the flight area, acquiring current network data including current connectivity data of the network nodes; and computing current 3D coverage data indicating current network coverage along three dimensions in the three-dimensional flight area by correlating the stored network data and the current network data, the 3D coverage data including an interference caused by the UAV.

Moreover, provided is a computer program comprising instructions which, when the program is executed by a computer, cause the computer to carry out the steps of acquiring current 3D coverage data indicating current network coverage along three dimensions in the three-dimensional flight area, the 3D coverage data being determined by correlating stored network data including location data of network nodes of a wireless communication network and current network data including current connectivity data of the network nodes, and performing the guiding of the UAV based on the current 3D coverage data, wherein the guiding of the UAV includes determining at least one of a flight path or a flight corridor including the flight path by minimizing a cost function including at least an interference caused by the UAV.

Further provided is a non-transitory computer-readable storage medium having stored thereon instructions to cause processing circuitry of an apparatus for guiding an unmanned aerial vehicle, UAV, in a three-dimensional, 3D, flight area within airspace, to execute the steps of acquiring, from a data storage, stored network data including location data of network nodes of a wireless communication network within the flight area, acquiring current network data including current connectivity data of the network nodes; and computing current 3D coverage data indicating current network coverage along three dimensions in the three-dimensional flight area by correlating the stored network data and the current network data, the 3D coverage data including an interference caused by the UAV.

Also provided is a non-transitory computer readable storage medium having stored thereon instructions to cause processing circuitry of an aviation control node for guiding an unmanned aerial vehicle, UAV, in a three-dimensional, 3D, flight area within airspace, to execute the steps of acquiring current 3D coverage data indicating current network coverage along three dimensions in the three-dimensional flight area, the 3D coverage data being determined by correlating stored network data including location data of network nodes of a wireless communication network and current network data including current connectivity data of the network nodes, and performing the guiding of the UAV based on the current 3D coverage data, wherein the guiding of the UAV includes determining at least one of a flight path or a flight corridor including the flight path by minimizing a cost function including at least an interference caused by the UAV.

BRIEF DESCRIPTION OF DRAWINGS

In the following detailed description, exemplary embodiments are described in more detail with reference to the accompanying figures and drawings, wherein.

DETAILED DESCRIPTION

Figure 1:
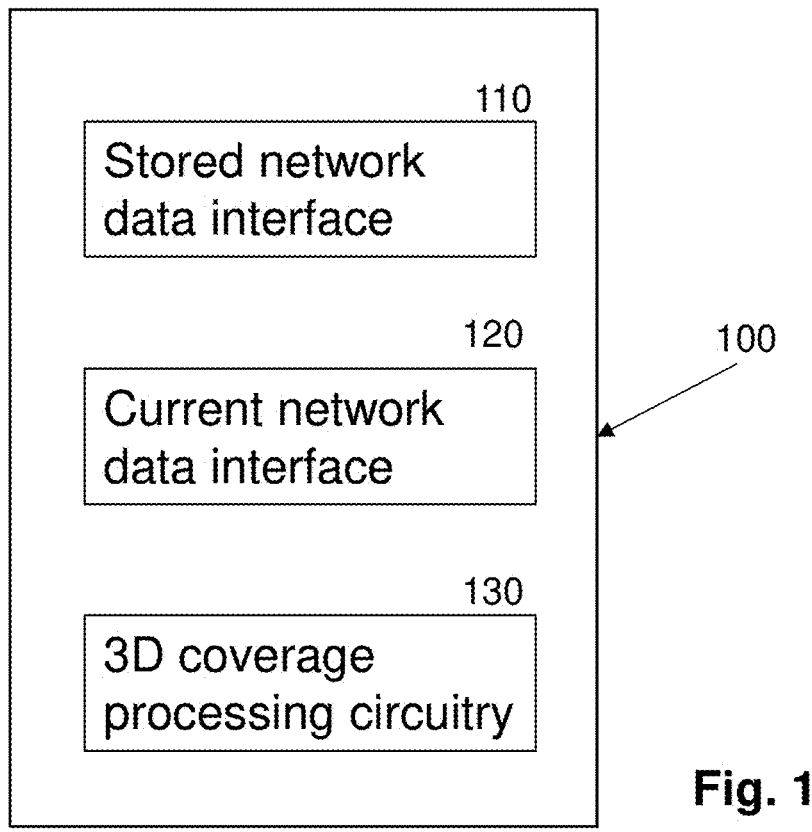
FIG. 1 is a block diagram of an apparatus for computing data for guiding UAVs (unmanned aerial vehicles)
Figure 2:
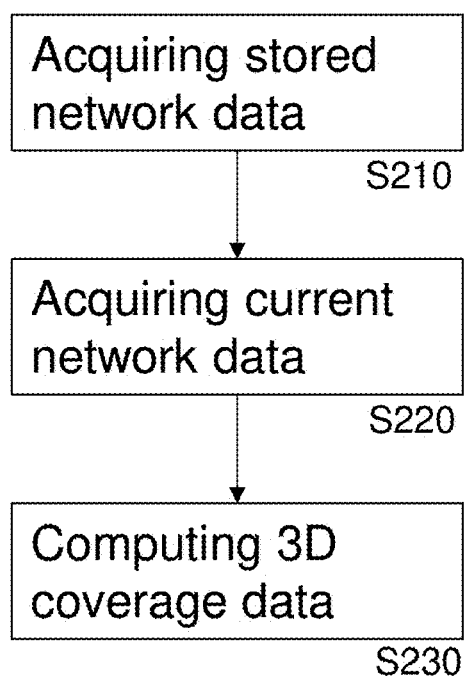
FIG. 2 is a flow chart of a method for computing data for guiding UAV.

To meet the requirements stemming from UAV operation beyond visual line of sight, the present disclosure proposes using wireless communication networks for providing a command and control link for planning, monitoring, controlling flights of UAVs. In particular, network planning information is taken into account for the purpose of guiding a UAV within a flight area.

However, radio network planning currently focuses on radio propagation and performance for users of mobile communication devices (such as mobile telephones) on even ground as well as in buildings. Mobile communication networks are planned, designed, constructed, and optimized for these use cases. Accordingly, conventional radio network planning is mainly based on a two-dimensional processing and view. In addition, shapes of buildings may be considered in a three-dimensional manner.

An example for a radio network planning tool that provides also 3D building data capabilities, by means of a user manual, is provided in here: *iBuildNet Professional User Manual*, Ranplan Wireless (accessed Jun. 11, 2020), https://ranplanwireless.com/files/National%20Advisory/Advanced%20Material/iBuildNet %204.0%20User%20manual.pdf, the disclosure of which is hereby incorporated by reference in its entirety.

Other examples for the world's leading radio network planning tools, also supporting 3D map data for building shapes, include:

Atoll from Forsk: *Atoll Overview*, Forsk (accessed Jun. 11, 2020), https://www.forsk.com/atoll-overview, the disclosure of which is hereby incorporated by reference in its entirety ASSET from TEOCO: *Radio Planning*, TEOCO (2020), https://www.teoco.com/products/planning-optimization/asset-radio-planning/, the disclosure of which is hereby incorporated by reference in its entirety Planet from Infovista: *Product Overview*, Infovista (2020), https://www.infovista.com/planet/rf-planning-optimization, the disclosure of which is hereby incorporated by reference in its entirety Examples of 3D digital maps providers for radio network planning include:

Visicom: *Digital Maps, Radio Frequency (RF) Map, RF Planning*, Visicom (2020), https://visicomdata.com/, the disclosure of which is hereby incorporated by reference in its entirety NTT data: *Telecommunication*, AW3D (2017) https://www.aw3d.jp/en/applications/?id=663, the disclosure of which is hereby incorporated by reference in its entirety Luxcarta: *Geodata for RF Planning and Optimization*, LuxCarta (2018), https://luxcarta.com/product/geodata-for-rf-planning-and-optimization/ and *Geospatial Products for RF Planning and Optimization*, LuxCarta (2018), https://luxcarta.com/resources/LuxCarta_RFPlanning&Optimization_2018_web.p df, the disclosures of which are hereby incorporated by reference in their entireties Conventionally, there is limited or no interaction between mobile communication networks and aviation or air traffic control and management. However, in addition to manned aviation, unmanned aviation involving unmanned aerial vehicles (UAVs) is evolving. In order to provide guidance for the UAV traffic, mobile communication systems represent an efficient approach. The development of UAV traffic management systems (UTMs) for handling the air traffic management/air traffic control in unmanned aviation imposes new requirements on mobile radio systems applicable to unmanned aviation.

For instance, the new requirements are due to the three dimensional (3D) nature of air traffic, in which height may play essential role in determining a flight path, especially in view of availability and quality of the wireless signal. Conventional network planning techniques do not allow for modeling a signal course in accordance with a three-dimensional pattern of positions (e.g. including the takeoff and/or landing of a UAV). Moreover, for the new use cases of unmanned aviation and UTM, new methods and metrics/parameters may become relevant, e.g. in view of the use of mobile communication systems.

Moreover, in conventional radio network planning, static states of radio network nodes (or their transmitters/receivers) are assumed. For instance, it is not considered whether a network node is currently in an on or off state. Conventional radio network planning does not provide current or "live" (real time) network plans, as for traditional radio network planning this is not a requirement, whereas it is critical for aviation purposes. For the evaluation or adjustment of the prediction or modeling, measured data from drive testing may be utilized. However, these measured data are snapshots recorded at a specific point in time on even earth and thus do not provide a reliable up-to date information.

In addition, conventional radio network planning does not provide interfaces or data formats which may be used in air traffic management.

Accordingly, the methods known from conventional radio network planning are not sufficient for satisfying the demands of UAV traffic management.

The present disclosure is directed at providing an apparatus and a method for efficiently determining the coverage of communication networks in a 3D flight area, to allow for flights of UAVs "beyond visual line of sight" (BVLOS).

Provided is an apparatus for computing data for guiding an unmanned aerial vehicle, UAV, in a three-dimensional, 3D, flight area within airspace, comprising a first interface configured for acquiring, from a data storage, stored network data including location data of network nodes of a wireless communication network within the flight area, a second interface configured for acquiring current network data including current connectivity data of the network nodes, and circuitry configured for computing current 3D coverage data indicating current network coverage along three dimensions in the 3D flight area by correlating the stored network data and the current network data.

Accordingly, determination of a current state of network connectivity and coverage is facilitated, for enhancing safety in UAV operation.

In some embodiments, the apparatus comprises an output interface configured for automatically reporting the current 3D coverage data to an aviation control node for granting an air traffic control clearance for the UAV in the flight area or for performing control of the UAV.

For instance, the second interface is configured for receiving event data indicating known future network events known to occur at the network nodes at a time later than receiving the event data.

For example, the current connectivity data include at least one of a current state of a network node out of an ON state and an OFF state; fault network data, and a workload, and the guiding of the UAV includes deviating from a previously determined flight path based on a change in network connectivity indicated by the current connectivity data.

E.g., the workload indicates a number of mobile terminals currently connected to one or more of the network nodes, and/or the traffic transmitted/received at one or more of the network nodes.

Accordingly, the present disclosure allows for a prompt adaptation of UAV operation including flight paths to a current state of the network by taking into account possible changes in the connectivity with low latency.

For example, the current network data include results of connectivity measurements performed by the UAV or a communication terminal different from the UAV.

Accordingly, validation and calibration of the 3D coverage computing process is facilitated by providing current measurements.

In some embodiments, the circuitry is configured to calculate a position of the UAV based on the results of the connectivity measurements performed by the UAV or based on a connectivity measurement of the connectivity of the UAV performed by the network.

This may facilitate providing redundant information on the position of UAVs to allow for safe and efficient guidance of the UAVs.

For instance, the current network data include an indication of a current number, or aggregated number over a period of time, of communication terminals per area unit, and the output interface reports that number of communication terminals per area to the aviation control node.

Accordingly, flight paths for UAVs can be planned so as to avoid flying above areas where many humans are currently present.

For instance, the current 3D coverage data include a signal power.

In some embodiments, the current 3D coverage data include an indication of a handover probability of handover by the UAV from one network node to another network node.

This facilitates alleviating the risk of connection loss due to handover.

For example, the handover probability depends on at least one of the moving speed and the moving direction of the UAV.

In some embodiments, the stored network data and the current network data include data of a plurality of wireless communication networks.

Accordingly, a redundancy in connectivity, as provided by plurality of communication networks may be utilized for maintaining a connected state of a UAV.

For instance, the three-dimensional flight area is subdivided into a plurality of sub-areas, and the circuitry is configured for computing the current 3D coverage data respectively for the plurality of sub-areas.

This facilitates precise efficient processing of a current 3D coverage as well as determination of a current network coverage, for instance when a different number of connectivity measurements are available in different regions of the flight area.

For example, the circuitry is configured for computing the current 3D coverage data based on a model for predicting 3D coverage, and the model is generated based on the stored network data and automatically updated based on the current network data.

In some embodiments, the model is updated by machine learning.

Further provided is a method for computing data for guiding unmanned aerial vehicles, UAVs, in a three-dimensional, 3D, flight area within airspace, comprising acquiring, from a data storage, stored network data including location data of network nodes of a wireless communication network within the flight area, acquiring current network data including current connectivity data of the network nodes; and computing current 3D coverage data indicating current network coverage along three dimensions in the three-dimensional flight area by correlating the stored network data and the current network data.

Accordingly, determination of a current state of network connectivity and coverage is facilitated, for enhancing safety in UAV operation.

In some embodiments, the method comprises automatically reporting the current 3D coverage data to an aviation control node for granting an air traffic control clearance for the UAV in the flight area or for performing control of the UAV.

For instance, the method comprises receiving event data indicating known future network events known to occur at the network nodes at a time later than receiving the event data. For example, the current connectivity data include at least one of a current state of a network node out of an ON state and an OFF state; fault network data, and a workload, and the guiding of the UAV includes deviating from a previously determined flight path based on a change in network connectivity indicated by the current connectivity data.

E.g., the workload indicates a number of mobile terminals currently connected to one or more of the network nodes, and/or the traffic transmitted/received at one or more of the network nodes.

Accordingly, the present disclosure allows for a prompt adaptation of UAV operation including flight paths to a current state of the network by taking into account possible changes in the connectivity with low latency.

In some embodiments, the current network data include results of connectivity measurements performed by the UAV or a communication terminal different from the UAV.

Accordingly, validation and calibration of the 3D coverage computing process is facilitated by providing current measurements.

In some embodiments, the method includes calculating a position of the UAV based on the results of the connectivity measurements performed by the UAV or based on a connectivity measurement of the connectivity of the UAV performed by the network.

This may facilitate providing redundant information on the position of UAVs to allow for safe and efficient guidance of the UAVs.

For example, the current network data include an indication of a current number, or aggregated number over a period of time, of communication terminals per area unit, and the output interface reports that number of communication terminals per area to the aviation control node.

Accordingly, flight paths for UAVs can be planned so as to avoid flying above areas where many humans are currently present.

For instance, the current 3D coverage data include a signal power.

In some embodiments, the current 3D coverage data include an indication of a handover probability of handover by the UAV from one network node to another network node.

This facilitates alleviating the risk of connection loss due to handover.

For example, the handover probability depends on at least one of the moving speed and the moving direction of the UAV.

In some embodiments, the stored network data and the current network data include data of a plurality of wireless communication networks.

Accordingly, a redundancy in connectivity, as provided by plurality of communication networks may be utilized for maintaining a connected state of a UAV.

For instance, the three-dimensional flight area is subdivided into a plurality of sub-areas, and the method comprises computing the current 3D coverage data respectively for the plurality of sub-areas.

This facilitates precise efficient processing of a current 3D coverage as well as determination of a current network coverage, for instance when a different number of connectivity measurements are available in different regions of the flight area.

For example, the method comprises computing the current 3D coverage data based on a model for predicting 3D coverage, and the model is generated based on the stored network data and automatically updated based on the current network data.

In some embodiments, the model is updated by machine learning.

Further provided is an aviation control node for guiding an unmanned aerial vehicle, UAV, in a three-dimensional, 3D, flight area within airspace, comprising an input interface configured for acquiring current 3D coverage data indicating current network coverage along three dimensions in the three-dimensional flight area, the 3D coverage data being determined by correlating stored network data including location data of network nodes of a wireless communication network and current network data including current connectivity data of the network nodes, and circuitry configured for performing the guiding of the UAV based on the current 3D coverage data.

This facilitates making efficient decisions and enhancing safety in UAV guidance.

Also provided is an aviation control method for guiding an unmanned aerial vehicle, UAV, in a three-dimensional, 3D, flight area within airspace, comprising acquiring current 3D coverage data indicating current network coverage along three dimensions in the three-dimensional flight area, the 3D coverage data being determined by correlating stored network data including location data of network nodes of a wireless communication network and current network data including current connectivity data of the network nodes, and performing the guiding of the UAV based on the current 3D coverage data. This facilitates making efficient decisions and enhancing safety in UAV guidance.

Also provided a computer program comprising instructions which, when the program is executed by a computer, cause the computer to carry out the steps of acquiring, from a data storage, stored network data including location data of network nodes of a wireless communication network within the flight area, acquiring current network data including current connectivity data of the network nodes; and computing current 3D coverage data indicating current network coverage along three dimensions in the three-dimensional flight area by correlating the stored network data and the current network data.

Moreover, provided is a computer program comprising instructions which, when the program is executed by a computer, cause the computer to carry out the steps of acquiring current 3D coverage data indicating current network coverage along three dimensions in the three-dimensional flight area, the 3D coverage data being determined by correlating stored network data including location data of network nodes of a wireless communication network and current network data including current connectivity data of the network nodes, and performing the guiding of the UAV based on the current 3D coverage data.

Further provided is a non-transitory computer-readable storage medium having stored thereon instructions to cause processing circuitry of an apparatus for guiding an unmanned aerial vehicle, UAV, in a three-dimensional, 3D, flight area within airspace, to execute the steps of acquiring, from a data storage, stored network data including location data of network nodes of a wireless communication network within the flight area, acquiring current network data including current connectivity data of the network nodes; and computing current 3D coverage data indicating current network coverage along three dimensions in the three-dimensional flight area by correlating the stored network data and the current network data.

Also provided is a non-transitory computer readable storage medium having stored thereon instructions to cause processing circuitry of an aviation control node for guiding an unmanned aerial vehicle, UAV, in a three-dimensional, 3D, flight area within airspace, to execute the steps of acquiring current 3D coverage data indicating current network coverage along three dimensions in the three-dimensional flight area, the 3D coverage data being determined by correlating stored network data including location data of network nodes of a wireless communication network and current network data including current connectivity data of the network nodes, and performing the guiding of the UAV based on the current 3D coverage data.

As described, provided is an apparatus 100 for computing data for guiding a UAV (unmanned aerial vehicles) in a 3D flight area within air space, which is shown in FIG. 1. Herein, a UAV may be a drone or any flying aircraft or in general an aerial vehicle which is fully controlled or assisted by a control or assisting instance such as an aviation center, e.g., aviation authority, UTM service.

In particular, the UAV may be a radio controlled UAV which receives control commands from a remote aviation control node, such as a UTM system or a UAV service provider, via wireless radio network. These control commands may include steering commands such as a change in direction or height or other commands for controlling the flight operation, e.g. power usage or requests for information, such as connectivity measurements.

However, a UAV may also have a lower degree of control corresponding to a higher degree of autonomous operation. In such a case, the UAV may use the radio connection for information for assisting autonomous control, such as navigation information, warnings, requested destinations, or information on traffic such as other UAVs or aerial vehicles, or on weather, as well as transmitting mission critical data to a control center, such as live camera or sensor data from for example, but not limited to, public safety, search and rescue missions.

In this disclosure, the expression "guiding a UAV" or "guiding UAVs" generally refers to command and/or control operations in UAV traffic management and control. For instance, guiding of UAV(s) includes at least one of the permission and prohibition of UAV flights in the flight area or a subsection of the flight area, granting of air traffic control clearances, or the issuance of warnings regarding UAV operability in the flight area or subsections of the flight area. Such operations may be performed by aviation authorities. In addition or alternatively, guiding of UAV(s) may further include at least one of the planning and determination of flight paths or a corridor in the flight area for a UAV flight in advance of a flight of a UAV as well as control and navigation during the UAV flight or flying operation. Therein, the control and navigation may include following a previously determined flight path as well as deviating from the previously determined flight path in view to a current or recent change in network connectivity or other conditions, e.g. weather, in the flight area. "Guiding UAVs" may further include providing data for guiding.

The apparatus is operable for computing data for guiding an UAV or a plurality of UAVs. For instance, if a plurality of UAVs are being operated, the connectivity measurement may be performed by one of the plural UAVs. The UAVs which are guided may include the UAV that has made the measurement and may further include different UAVs. Accordingly, based on an anomaly detected based on a measurement by one UAV, a guiding operation or decision may be made for the same UAV and/or one or more different UAVs.

The apparatus comprises a first interface 110 configured for acquiring, from data storage, stored network data including location data of network nodes of a wireless communication system or network within the flight area. The apparatus further comprises a second interface 120 configured for acquiring current network data including current connectivity data of the network nodes.

The first interface and/or the second interface can be, for instance, a data interface or a communication interface.

The acquiring from data storage may be reception or retrieval of the data.

The data storage may be, for example, a computing or data node such as a server, a database, or a database server. Moreover, the data storage may be an internal storage or memory included in the apparatus, or an external computing node.

The wireless communication network may be a cellular system such as UMTS, LTE or New Radio, 4G, 5G, WiMAX or any other network. Network nodes may include, for example, base stations of the wireless communication systems or networks, such as an eNodeB or similar base station of LTE, which have one or more transmission and reception antennas. However, this disclosure is not limited to the above-mentioned systems, and other terrestrial systems or different systems such as satellite radio systems may be included as well. Accordingly, in addition or as an alternative to base stations, the network nodes may include satellites.

For instance, the location data, or positional data, indicates the positions of the network nodes. In particular, an indication of the coordinates of the antennas or antenna panels included in the network nodes, possibly including a horizontal position and a height of the antenna panels with respect to the ground or some other reference point, e.g. sea level, a point of origin, etc., may be provided. In the case of terrestrial systems such as LTE, the positions of the network nodes are usually fixed for a given operating duration. However, for satellites of a satellite system or other mobile network nodes, the positions of network nodes may vary over time.

The 3D flight area may partially or completely include the area of service of the communication network.

The apparatus further comprises processing circuitry 130 configured for computing current 3D coverage data indicating current network coverage along three dimensions in the 3D flight area. The current 3D coverage data is computed by correlating the stored network data and the current network data.

The apparatus 100 may be a processing node such as a server, an array of servers, or a data base, e.g. a server of a cloud computing service. The apparatus may comprise the data storage (such as a hard disk or a RAM, random access memory), in which case the stored network data is internally stored in the apparatus 100. Alternatively, the stored data may be acquired from an external node.

Apparatus 100 may be operated by and/or deployed at one or more of a service, operator or institution such as communication network operator, an aviation service such as aviation authority, UTM system, or a data processing service providing coverage data for an aviation service, depending on where, e.g. at which of these services, stored and current network data is available.

Furthermore, processing for determining the current 3D coverage data may be split between or distributed among one or processing nodes operated by a network operator, an aviation authority or UTM service, UAV service provider and an intermediate data processing service such as a hub data center between the network operator and the aviation/UAV operator. In such a case, apparatus 100 may constitute a processing system comprising a plurality of processing nodes.

The term "circuitry" refers to processing circuitry such as one or more processors or CPU(s) (central processing unit(s)), and includes hardware components such as ASIC (application specific integrated circuit), FPGA (field programmable gate array), software implementations running on any hardware, or any combination of hardware and software. In correspondence with apparatus 100, provided is a method for computing data for guiding UAVs in a 3D flight area within airspace, to be performed by apparatus 100. The method comprises acquiring S210 from a data storage stored network data including location data of network nodes of a wireless communication system/network within the flight area, acquiring S220 current network data including current connectivity data of the network nodes, and computing S230 current 3D coverage data indicating current network coverage along three dimensions in the three-dimensional flight area by correlating the stored network data and the current network data.

With the above-disclosed apparatus and method, the present disclosure enables three-dimensional radio network planning, in particular 3D connectivity planning for aviation systems. Moreover, the disclosure enables modeling a current state of a communication network. Thus, the disclosure facilitates satisfying the demands that are imposed on radio network planning and communication in particular by UAV traffic and UTM. Moreover, examination, planning, and optimization of radio signals along flight paths is enabled in three dimensions to be applied by UAVs.

In this description, details, examples and embodiments shall refer to apparatuses as well as methods provided, unless the context or explicit indication indicates otherwise.

Furthermore, the term "connectivity data" refers to any data or information from which a connection status of the network or one or more network nodes of the network is derivable. For instance, the connectivity data may include an indication regarding a current status of a network node, such as an ON state, an OFF state, a network configuration, fault network data, workload (e.g. a workload indicating a number of mobile terminals currently connected to one or more of the network nodes, and/or the traffic transmitted/received at one or more of the network nodes such as used resources out of the uplink and/or downlink resources available to the cell), or measurements performed by the network node or by mobile terminals (possibly including UAVs), current transmission power at the receiver, a current transmission direction, directivity (gain minus masking loss), MIMO (multiple input multiple output) settings, etc., which may be provided by the operator of the network. For instance, the second interface 120 may connect the apparatus 100 to a processing node (e.g. server) of an operator of a wireless communication system or network, from which the data (streaming data, "live" data) are streamed and updated continuously (e.g. frequently at regular intervals, or whenever new connectivity data is received).

The current 3D coverage data comprise parameter(s), metric(s) or indicator(s) which are relevant for indicating or predicting, for a mobile communication device including a connected UAV equipped with one or more SIM(s) (subscriber identity module(s)) or LTE (Long Term Evolution) or 5G module, the ability to connect with a wireless communication network at a given 3D location at a given point in time. E.g., in the computing of 3D coverage data, a mapping between a 3D location within the flight area and one or more parameters indicating a predicted connectivity or connectability at the point is determined for a current point in time or a time interval which is sufficiently small to represent a current coverage status of the network. By determining and making the connectivity-related parameter or metric available for the flight area, a current 3D coverage or 3D coverage status of the communication network/system is obtained. For instance, the 3D location is expressed by geographical coordinates such as WGS 84 (World Geodetic System) or ECEF (earth-centered, earth-fixed)/ECR (earth-centered rotational) coordinates.

The flight area is a three-dimensional (3D) flight area within three-dimensional air space. The flight area is not limited to any particular area size, and may range, for instance, from an urban area to an area equal to or larger than the state area of, e.g., Germany (which is 357 386 km$^2$). For air traffic of UAVs, the height may typically range from ground level to a maximum flight altitude or height which may limited by law or regulations. Exemplary mandated maximum flight heights for UAVs are 500 feet above the ground in the USA and about 150 meters above the ground in Europe (see references *Fact Sheet—Small Unmanned Aircraft Regulations (Part* 107), Federal Aviation Administration (2016), https://www.faa.gov/news/fact_sheets/news story.cfm?newsID=20516 and *UAS ATM CARS Common Altitude Reference System Discussion Document*, European Organisation for the Safety of the Air Navigation (2018), https://www.eurocontrol.int/sites/default/files/2019-05/uas-atm-cars-v1.0-release-2018112_0.pdf, the disclosures of which are hereby incorporated by reference in their entireties).

However, the above-mentioned regulations are merely exemplary rather than limiting with respect to the flight area or height for the applicability, as UAVs may in principle fly significantly higher.

For instance, an indication of the flight area is received by an interface, which may be different from the first and second interfaces. For instance, an apparatus (e.g. server) for computing current 3D coverage data may serve a plurality of flight areas. The indication of the flight area may be provided as an identifier of an area or of the starting/takeoff location and/or destination, to which the flight area is then mapped. Alternatively, the apparatus may serve a single configured flight area, in which case an indication of the flight area may not be necessary.

In some embodiments, the current 3D coverage data are automatically reported, e.g. by an output interface, to one or more aviation control nodes (e.g. server, client, or data base, or cloud) for granting an air traffic control clearance for the UAVs in the flight area or for performing UAV control. The aviation control nodes comprise nodes operated by one or more of aviation authorities, ATM (air traffic management) systems, UAV service providers, UTM systems, or UAV control centers. The current 3D coverage data may be reported to one or more aviation control nodes including the above-mentioned examples. Computing apparatus 100 and the aviation control node may be integrated, e.g. hosted by a single server or commonly operated by an aviation authority. Alternatively, computing apparatus may be operated by an aviation data service provider remote from an aviation authority.

In particular, based on the 3D coverage data, an aviation authority enabled to assess in which parts of the flight area the signal quality is sufficient for granting air traffic of UAVs in particular BVLOS. Accordingly, the aviation authority is enabled to grant an air traffic control clearance for the flight space or parts of the flight space for which a sufficient signal power has been determined.

Moreover, if the 3D coverage data is reported to a UAV control center (e.g. operated by a UAV service provider), the UAV control center is enabled to determine and optimize a flight path or flight paths of UAVs controlled by the UAV control center and/or operated by the UAV service provider.

Accordingly, the present disclosure provides for automatic data transfer to aviation control centers, control systems/devices, UTM systems and similar facilities. This facilitates an exchange of information about safe areas (e.g. sub-areas of the flight area) where signal quality and/or coverage is sufficient for performing flight operations of UAVs. Accordingly, such information becomes available for flight planning and optimization and may contribute to safety in aviation, particularly for UAVs. E.g., UTM may determine an optimal flight path based on the 3D information. For instance, the optimal path as a path having continuous coverage of at least a certain quality or signal strength or the like. Further supplementary criteria for the determination of an optimal flight path may be a change probability or handover probability of the connected network node, which will be described below, a number of handovers, roaming costs, etc.

It should be noted that in some cases, a communication network and an aviation authority or UTM system may be operated by a common operator. Accordingly, current coverage data may be transmitted to the same processing node from which network-specific coverage data over respective input and output interfaces or an integrated input-and-output interface. On the one hand, as mentioned above, the connectivity data may include a current network state such as ON/OFF states of network nodes, workload (number of mobile terminals currently connected to the cell/node and/or the traffic transmitted/received at one or more of the network nodes, such as used resources out of the uplink and/or downlink resources available to the cell), (current) transmission power at the receiver, a current transmission direction, directivity (gain minus masking loss), MIMO (multiple input multiple output) settings, etc., which may be provided by the operator of the network.

Some examples of the current network data included by the connectivity data, may include but are not limited to of network nodes of the respective communication networks:

Node data or node location data such as Market ID (for the location of the network node); eNodeB ID (network node identification in LTE); Sector Number; eNodeB Name; eNodeB Activity Status; Network node Longitude; Network node Latitude; Network node Altitude; Cell ID (network specific identification of the respective network node); eCGI (E-UTRAN Cell Global Identifier—for unique global identification of the network node); Physical Cell ID; Height of the Antenna position; Antenna (type, name), Antenna Gain; Antenna Azimuth (in degrees relative to absolute north); Antenna Mechanical Downtilt (in degrees relative to the horizontal plain); and Antenna parameters or transmission/reception characteristics, such as Reception losses (dB—decibel); Transmitter Transmission losses (dB); Transmitter Max Power (dBm—decibel relative to a Milliwatt); EPRE (Energy Per Resource Element) per antenna port (dB);

Total ERP (effective radiated power, W—Watt); Total EIRP (equivalent isotropically radiated power, W).

Regarding the above mentioned node data and node location data, some of the included information may be provided as current network data although location data of network nodes is already included in the stored network data, as mentioned above. However, for stationary network nodes, provision of node or node location data in the current network data may facilitate validating and/or updating the stored network data or the current connectivity state of the network nodes. Furthermore, for moving network nodes such as satellites, the stored network data may for instance include an indication of a planned path of motion of the node, or previous positions of the node, whereas the current network data indicates a current position.

It should be noted that the connectivity data is not restricted to data describing a current status. In addition, "event data", e.g. an indication of known future events, may be received by the second interface, wherein the future events are known to occur at a point in time later than the reporting of the events and the reception at the second interface. Such known future events include future OFF states of network nodes due to planned maintenance or repair works, an installation of a new antenna, or a relocation or removal of an existing network node or antenna. Furthermore, in the case of satellite networks, such known future events may include the launch or startup of a new network satellite or a known correction of an orbit of a satellite.

On the other hand, the current network data may include results of connectivity measurements performed by the UAVs. For instance, a UAV may provide, over an uplink control channel of a wireless communication network, channel measurements to the network, which are then reported, via the second interface 120, to the apparatus 100. Current measurement results, if frequently or regularly provided, may facilitate validating, checking, or updating the current 3D coverage data as well as the current and stored network data at a position from which the UAV has reported the measurement. For instance, measurement results from UAVs may be received from network nodes deployed at or operated by wireless network operators, aviation authorities, UTM systems, or UAV service providers.

As mentioned, connectivity data may include measurements performed by UAVs. In addition to the result of the measurement, an indication of the location within the flight area where the measurement has been performed may be received. For instance, the location may be measured by means satellite navigation such as GPS (Global Positioning System) or by deriving the location of the measuring device relative to a plurality of radio network nodes from the signal strength(s) of the signals received from the respective nodes. However, in some cases, the location may be known or determined by the apparatus 100, e.g. by circuitry 130, without receiving an indication, for instance if the measuring device is stationary or if a flight path of a UAV is known in advance.

In addition to correlating the current network data with the stored network data, the current network data, such as the above-mentioned results of connectivity measurements performed by the UAV, may be used to estimate or calculate a position of the UAV.

Accordingly, the circuitry of apparatus 100 may be configured to calculate a position (e.g. a 3D geo position) of the UAV based on the results of the connectivity measurements performed by the UAV or based on a connectivity measurement of the connectivity of the UAV performed by the network (e.g. a signal strength of an uplink reference signal received by the network node from the UAV, or traces). For instance, in the calculation of the position of the UAV, the circuitry may correlate signal measurements from the UAV or from the network with the network configuration, e.g. as indicated by the stored network data.

Furthermore, the output interface may be configured to report, automatically or upon request, the calculated position of the UAV to the aviation control node.

On the side of air space regulators and aviation systems, there may be a desire for redundant information sources. In particular, the position of the UAV is critical for BVLOS drone or UAV operations. Under certain circumstances, providing positional information on UAVs from GNSS systems may not be sufficient, for instance, if a satellite signal is not available or if outages in the GNSS system occur. Thus, an interest may arise for other information sources, such as measurements of connectivity.

On the one hand, the connectivity measurement based calculated or estimated position of a UAV may be used at the aviation control node for the guiding of the UAV. In particular, when the guiding of the UAV relies on a geo-position obtained from a GNSS (Global Navigation Satellite System such as GPS, Global Positioning System), the calculated position may be used as an additional or redundant data source. For instance, the connectivity-measurement based calculated position may be combined with the GNSS data to calculate of validate one or more coordinates (e.g. the height of the UAV) of the UAV position. An aviation control node guiding the UAV, such as an UTM system or UAV service provider, may obtain the UAV position with an enhanced degree of precision and/or reliability. For instance, sufficiently precise information on the UAV position may still be available in areas to at time instances when the GNSS signal is weak, e.g. due to terrain, buildings, weather or other conditions. Furthermore, the connectivity measurement based calculated UAV position may be used for detecting anomalies or fluctuations (e.g. spatial and or temporal) in the GNSS signal, in order to facilitate for the aviation control node initiating and conducting emergency operations.

On the other hand, the calculated or estimated position may facilitate for the aviation control node to know and track the 3D positions of UAVs as well as the number and density of UAVs within the flight areas or sub-areas of the flight area, which may be used in the determination of flight paths, such as planning of flight paths and rescheduling or modification of predetermined flight paths. Furthermore, the calculated UAV positions and/or the numbers and densities of UAVs may facilitate determining safe areas or safe zones in the flight area, e.g. for granting air traffic control clearances or flight permissions for UAVs in these areas or zones.

Current network data may also include measurements from the running system which are conducted in the network directly, e.g. by means of network probes that monitor the respective interfaces. Such network data is continuously monitored for each IMSI (International Mobile Subscriber Identity), which uniquely identifies respective users of a wireless network. To this end, call trace technologies may be implemented by the operators of the wireless networks. Therein, information about performance of the network generated by the mobile terminals or communication devices, such as reports of connection failure, are collected by the operator on a server or some other entity. Thus, such data can be derived for each UAV or other communication terminal in the network that embodies a SIM (subscriber identity module) card for communication as well as identification. Moreover, the data about performance may be combined with positional data of the reporting mobile communication device. Accordingly, in addition or alternative to measurements by UAVs, the current network data may include measurements performed by other communication terminals or user equipment different from UAVs, such as mobile phones or tablet computers.

Moreover, in some embodiments, the current network data includes an indication of the number of communication terminals per area unit, e.g. a local density of communication terminals. For instance, a current number or an aggregated number of communication terminals per unit area, which is aggregated over a period of time, is provided. The current number of communication terminals per area is reported to the aviation control node, in addition to or included in the 3D coverage data. Such a number of communication terminals per area unit or local density may be determined by computing or collecting positions of communication devices or terminals in a cellular network. Accordingly, by determining a local communication terminal density, a "traffic density map" may be provided, representing highly populated areas, e.g. areas where many people are. Such information may vary over time, as people commute and move over the period of a day, etc.

The information on where people are however may be of very high interest to so called SORA (Specific Operations Risk Assessment) processes for unmanned aviation flight path planning and approval processes. If there is a high risk to cause any damage to people, this area may be decided to become a less preferred area for a UAV to fly over. Providing such data to UTM systems, in addition to the connectivity information, may therefore facilitate increasing the safety of the UAV operation.

For instance, the current 3D coverage data include a prediction of a current signal power, signal strength, or a related parameter such as SNR (signal to noise ratio), SINR (signal to interference plus noise ratio), or interference.

Due to interference caused by the UAV, e.g. when performing uplink transmissions for guiding and navigation or for user data, a UAV can generate an impact on a communication network. For instance, when a UAV, or a communication terminal on board of the UAV or carried by the UAV, transmits data with a high data rate, e.g. a video, from an altitude well above cell towers and network node antennas, the UAV may be visible to several different network nodes, possibly including network nodes suitable for serving the UAV as well as network nodes not suitable for serving the UAV. In such a case, the UAV may generate an interference, e.g. in the uplink of a mobile network channel, to one or several different base stations at the same time, possibly including interference caused by a communication device carried by the UAV or on board. Therein, it should be noted that also network nodes that the UAV is not connected to or that are not suitable for connecting the UAV and performing radio controlled guidance of UAVs may be affected by interference caused by UAV traffic and thus suffer a deterioration in signal quality offered to other mobile terminals.

Therefore, an interference caused or generated by a UAV and affecting the network (network nodes or base stations as well as user terminals) may be considered when calculating the 3D coverage data such as current 3D coverage data and, possibly, when computing the network performance for other terrestrial users. For instance, one or more of the stored network data, the current network data, and the 3D coverage data may include an interference caused by the UAV or by UAVs.

By correlating the UAV data or the connectivity data corresponding to a UAV (such as service used by the UAV, speed, e.g. moving speed in one or more directions, transmit power, and interference) with the network data (stored network data as well as current network data, possibly from various data sources and possibly including traces of UAVs and other mobile communication devices, or flight paths of UAVs), the impact of the UAV onto the network performance for other UAVs and, more generally, other customers (e.g. terrestrial customers including mobile communication devices) may be determined. Moreover, apparatus 100 may receive, e.g. via the first or second interfaces and possibly from an aviation control node UAV, planned flight paths where UAVs are to be guided at a time later than receiving the reporting of the planned flight paths, which may then be included in the correlation of stored and current connectivity data for computing the current 3D coverage including computing an interference caused by UAVs.

For instance, the stored and/or current network data may include an interference determined by a base station, e.g. the base station may measure an interference or an indicator of interference or quantity related to interference (e.g. SINR), and the interference data determined by the base station (e.g. interference, indicator or related quantity) may be reported to apparatus 100. In addition to the interference data, the base station may report the positions and/or identities of the UAVs. However, the apparatus may also calculate positions of UAVs (e.g. by using GNSS data and/or connectivity measurements performed by the UAV or base station). For instance, a network node may provide or send network data such as indications of positions of connected UAVs and/or a signal strength transmitted by a UAV, which may then be used by apparatus 100 to determine an interference caused by the UAV. Thus, apparatus 100 may calculate the interference caused by a UAV or by UAVs, based on data determined by and received from the base station.

However, the stored and/or current network data may further include, additionally or alternatively, an interference determined (e.g. estimated, calculated or measured) by a UAV. For instance, the UAV estimates the interference caused by the UAV based on uplink data transmitted and/or based on a signal power or signal strength caused by transmitting data or control signaling. The UAV may send the determined interference to an aviation control node, server, communication network node, or to apparatus 100. Apparatus 100 may receive, e.g. via the first interface 110 or second interface 120, the interference determined by the UAV or the result of interference determination or estimation from the UAV, from the communication network (e.g. network node/base station or network server), or from an aviation control node (e.g. aviation authority, UAV service provider).

As an alternative to the above example, a UAV may report data for estimating an interference, e.g. connectivity data such as positional data or determined signal power, based on which apparatus 100 determines the interference caused by the UAV, e.g. by correlating current connectivity data and stored connectivity data as described herein and/or by correlating received data from a plurality of UAVs. Accordingly, the stored and/or current connectivity data may include connectivity data determined and/or estimated by a UAV, and the circuitry determines a connectivity caused by the UAV.

For instance, the UAV may estimate or pre-estimate an interference it causes for the network, or a signal strength for an uplink transmission or other parameters related to or indicative of interference, as described above, based e.g. on a data volume to be transmitted by the UAV. Then, the UAV may transmit the estimate of interference it causes to a network node or to apparatus 100, e.g. via a web application or client. Such estimate of interference may be used by apparatus 100 to determine the interference caused by UAVs, possibly in combination with an interference determined or measured by base stations or other communication devices, e.g. to obtain some redundancy.

Furthermore, apparatus may aggregate the received and or calculated interference received from plural sources (e.g. UAVs or groups of and network nodes possibly of different networks such as networks operated by different network providers) and calculate an interference caused by UAVs guided in the flight area.

Further, as an indication of the interference caused by the UAV, the current network coverage data may include an indication (such as a metric) of an interference at a 2D location or 3D location in the flight area or at a position (e.g. a position of a base station or antenna)/2D area on ground (such as a network cell area served by a base station), an indicator of a metric of an interference per network cell (e.g. an average interference per cell area), or an "interference heat map" indicating an interference caused by UAV guidance or operation and impacting a communication network operating In the flight area (e.g. a heatmap which indicates at which positions in the cell user equipments are particularly affected by the interference)).

In any of the above examples, the interference caused by the UAV may include interference caused by communication device on board the UAV.

This information on the interference caused by the UAV and/or on the resulting impact on the mobile communication network (or networks) may be used to optimize the network (e.g. by adapting or adjusting antenna beams, antenna systems, MIMO (multiple input multiple output settings), power levels e.g. of uplink transmissions and possibly including power levels of multiple antennas of an antenna array in MIMO operation, antenna orientation, configuration parameters such as handover-lists, frequency allocation to cells, allocation of frequency domain and time domain resources to UAVs, possibly including dedicated frequency resources (e.g. bandwidth) and time resources (e.g.

subframes or transmission time intervals) for UAV communication, and time resource element allocation in time and frequency domain, network slice management (e.g. creating, activating, operating and deactivating slices or partitions of the communication network or PLMN (public land mobile network))).

Accordingly, the output interface may report an interference caused by a UAV or an interference due to UAVs in a specific location, such as a sub-area of the flight area or a location of a network node or base station of the communication system, to an aviation control node, which may use the information on the interference for minimizing an impact of interference due to UAV traffic on the network or to minimize an interference from other UAVs on the UAV to be guided, in order to facilitate safe flight operation and possibly optimize the network, e.g. by performing the above-described adaptations.

It should be noted that the current 3D coverage data may generally include an indication of interference caused by or resulting from guiding the UAV. For instance, in addition to interference caused by the UAV transmitting data on the uplink, the current 3D coverage data may also include an indication of interference caused by guiding the UAV, such as downlink data generated by a network node and/or an aviation control node guiding the UAV, e.g. when transmitting steering control commands or when communicating a flight path or route or a current change in the flight path to the UAV.

On the one hand, for instance, the interference caused by the UAV or by UAVs and/or possibly by UAV guidance or traffic, is reported to a mobile communication network, e.g. a network node, network server, or base station, which may use the reported interference caused by an UAV or UAVs for optimizing the network as described above, which may include modifying the current network configuration, e.g. readjusting antenna beams allocating time and frequency resources such as bandwidths, and adjusting power and directivity of transmissions, as well as performing long-term optimization, such as installation of antennas with specific directions. Furthermore, a communication network provider may use location based information on interference in decisions on which parts or sub-areas of a served area/flight area may be granted for UAV traffic.

On the other hand, the interference caused by a UAV or by UAVs, or by guiding the UAV(s), may be output to an aviation control node (e.g. aviation authority, ATM, and/or UAV service provider), which may use a current interference for guiding the UAV along flight paths where the interference caused by the UAV traffic and the impact on network performance, e.g. for non-UAV participants, is kept at a tolerable level.

Accordingly, network performance may be optimized for UAVs as well as other communication devices served by the communications network. Thus, the present disclosure may facilitate allowing for a stable coexistence of UAV guidance in one or more wireless communication systems with other communication devices served by the network and provide for a sufficient reliability of such a network used for UAV guidance and operation as well as other mobile communication.

However, the current 3D coverage data is not limited to a signal power or related parameter. The current 3D coverage data may also include an indication of a handover probability by the UAV from one network node to another network node. The handover probability is a change probability of a change of the network node, from among the network nodes of the communication network or system, with which a UAV is currently connected. The change probability is a probability with which the UAV will switch connections from one network node to another network node.

The provision of a handover probability, which may also be switching probability, of an active connection from one network node to another network node, may facilitate the choice of a stable and lasting connection particularly when the connected device such as a UAV is moving in air space at a certain height (e.g. 150 m) above ground. This is because at such height, a plurality of network nodes possibly having similar signal powers may be identified by the UAV, depending, e.g., on topography, network design, and position of network nodes as well as of the UAV. Moreover, a UAV may not necessarily change or switch network nodes immediately whenever another network node is detected to have a stronger signal power than the network node to which the UAV is currently connected. For instance, to prevent too frequent switching, a change of network nodes may be performed only when the signal of the other, unconnected network node is determined to be significantly stronger for a given time interval.

For instance, the handover probability may be dependent on at least one of a location, a moving speed, a moving direction, and an envisaged or planned flight path or trajectory of the UAV.

For instance, for a mobile receiver (e.g. UAV) to change from one network node A (best serving network node) to another network node B, the signal received at the UAV from network node B has to exceed the signal level received from network node A by a defined threshold, a delta greater than zero. Also, this signal has to be continuously better for a defined time interval. Only if the received signal from Node B is better by a defined signal delta—a handover-threshold—for the duration of a given time, the serving node will be changed. Based on the above-mentioned or other rules for a change between network nodes, a change probability may be predicted by comparing the signal strengths of different network nodes in the flight area or along a planned or flight path or a plurality of possible flight paths of an UAV. Alternatively, the determination of a change probability may be based on a count of handovers of UAVs which have actually been performed per area in a given time interval.

Alternatively, rather than outputting a handover probability, the determination of a signal power may take into account the above-mentioned handover threshold or a bias for the network node with which the UAV is currently connected.

In wireless networks, the change of serving nodes is one of the dominant risks for connectivity loss. Therefore, for fast moving UAVs, who have a very different visibility to signals from various network nodes—compared to terrestrial users, the 3D areas with high probability of network node changes are less suitable for safe UAV BVLOS operation. Thus, the provision of a change probability of a change of connections of a UAV among network nodes may facilitate determination of safe regions for UAV traffic within the 3D flight area.

The provision of the handover probability (or a probability of handover between network nodes/cells) of a currently connected network node may facilitate optimization of flight paths by UAV service providers in view of a stable connection and or in view of saving energy and processing power otherwise needed for monitoring the signal strengths of network nodes or switching operations.

As mentioned above, the handover probability (or "change" probability of a change of network nodes) may depend on the speed of a UAV to be guided. Different types of UAVs, for instance UAVs capable of moving at different speeds, or UAVs which may be of a same type, but are scheduled to move at different speeds, may have different requirements not only for the handover probability, but also for other parameters such as a required signal power or signal power threshold. Accordingly, in addition to or as an alternative to the handover probability, at least one other parameter included in the current 3D coverage data, such as signal power, signal strength, SNR, SINR, and/or interference, may depend on a moving speed of a UAV.

In addition to the current 3D coverage data, the output interface of the apparatus 100 may report an identification of a UAV, e.g. as described via specific identifications of the UAV as a mobile communication apparatus, such as IMSI or SIM card, to the aviation control node, such as an aviation authority, or another third party. For instance, the circuitry of the apparatus 100 may correlate connectivity measurements performed by the UAV with the corresponding network subscriber information of the UAV performing the measurement. As a result, it is possible for the aviation control node or other actors or third parties to know which UAV has performed the measurement and which UAV is currently located at a certain location or within a given area of the flight path, which may further be used to identify the operator or owner of the UAV, such as a UAV service provider. For instance, this may facilitate interaction between a UAV service provider and an aviation authority in control and guidance of UAV traffic.

By outputting 3D coverage data including the above-mentioned parameters such as a signal power and a handover probability, an operator of UAV traffic or a UAV service is enabled to find an optimized flight corridor and/or flight path for a desired destination and/or for a rough flight path input. This may be performed by minimizing a cost function including at least one of these above mentioned parameters or additional parameters (e.g. energy consumption of UAVs, desired flight altitude, roaming costs, number of people or communication terminals per area unit within the flight corridor, etc.,) in order to obtain the optimum path or desired path or a corridor within the flight area with acceptable features, or the like. Operation of the aviation system, e.g. UAV flight scheduling and controlling and determination of flight paths or flight corridors for the UAVs and controlling of the UAVs within the corridor or on the flight path may be performed based on the optimization.

Furthermore, as mentioned above, it may be desirable to minimize the impact of UAV traffic on network performance of one or more mobile or wireless communication networks. Therefore, the parameters of the cost function to be minimized may include, either alone or in combination with above-mentioned parameters, a calculated or estimated interference caused by the UAV impact of the flight of the UAV on the performance of a wireless communication network or networks. In determining of the optimized flight path includes determining a 3D trajectory of the guided UAV in three dimensions of air space. For instance, the height of the UAV may be determined in accordance with the visibility of the UAV to network nodes, to control the interference of the UAV and the impact on the network caused by the UAV flight.

Moreover, in addition to network data, the stored data acquired from the data storage may comprise topography or terrain data indicating a topography of a surface area covered by the three-dimensional flight area (a surface area below the flight area). The topography data may include a terrain (e.g. mountains, bodies of water, vegetation, gradients), and shapes of buildings.

In addition to the network data and possibly topography data, weather data may be received over the first interface 110 and/or the second interface 120 or another interface. The weather indicates measured, predicted, and/or stored/recorded (e.g. historical) weather conditions in the flight area. The weather conditions may include the presence or absence of a snow or ice cover on the ground surface, wet surfaces, fog, rainfall, or snowfall, and/or seasonal properties such as foliation conditions. The provision of weather data may facilitate accurately determining 3D coverage since weather conditions including the aforementioned examples may have significant impact on signal quality in view of radio wave propagation characteristics such as reflection or dispersion caused by such weather phenomena.

Sources of the weather data may include weather stations providing predictions and/or measurements, satellites, radar measurements, as well as camera images which are then subjected to pattern recognition in order to extract information about weather conditions. E.g., the weather data may include photo images recorded by UAVs.

In some embodiments, the stored network data and the current network data include network data provided from a plurality of wireless communication networks or systems and indicating network properties these plural wireless communication networks. The plurality of communication networks may include one or more terrestrial radio networks implementing systems such as 4G, LTE, LTE-Advanced, "ultra long range" LTE systems which also provide airplanes travelling at 10 000 m altitude with broadband internet connections, 5G (e.g. 3GPP New Radio, NR) possibly operated by different operators, or further developments of such systems particularly adapted to the requirements of aviation, satellite radio networks, in particular LEO (low earth orbit) systems providing a sufficiently low latency, hybrid systems which include both earth-based as well as satellites or other air or space travelling network nodes. In addition to or instead of satellites, a communication system may have aerial vehicles such as airplanes or gas balloons, or UAVs as network nodes.

By acquiring stored and/or current data from a plurality of communication networks or systems, a UAV may be enabled to select a network node for connecting from a larger number of network nodes. Such redundancy may facilitate extending 3D coverage, maintaining connectivity during a UAV flight, and increasing safety in UAV operation.

For instance, apparatus 100 may acquire network data from a plurality of networks if operated by an operator of a plurality of networks. On the one hand, apparatus 100 may combine the data from the plurality of networks. On the other hand, in general, current coverage data including parameters which indicate a current connectivity are calculated per respective communication network. A combination or fusion of coverage data of different networks may be performed after the current coverage data has been generated per respective network. For instance, apparatus 100 computes and outputs single-network coverage data or network-specific coverage data.

For instance, the above-mentioned handover probability (the probability of a change of a network node to which the UAV is currently connected) may comprise the following cases: handover probability between network nodes of the same network, handover probability between network nodes of respectively different networks, or handover probability between network node irrespective of whether the handover is performed within a single network or between networks.

Figure 3:
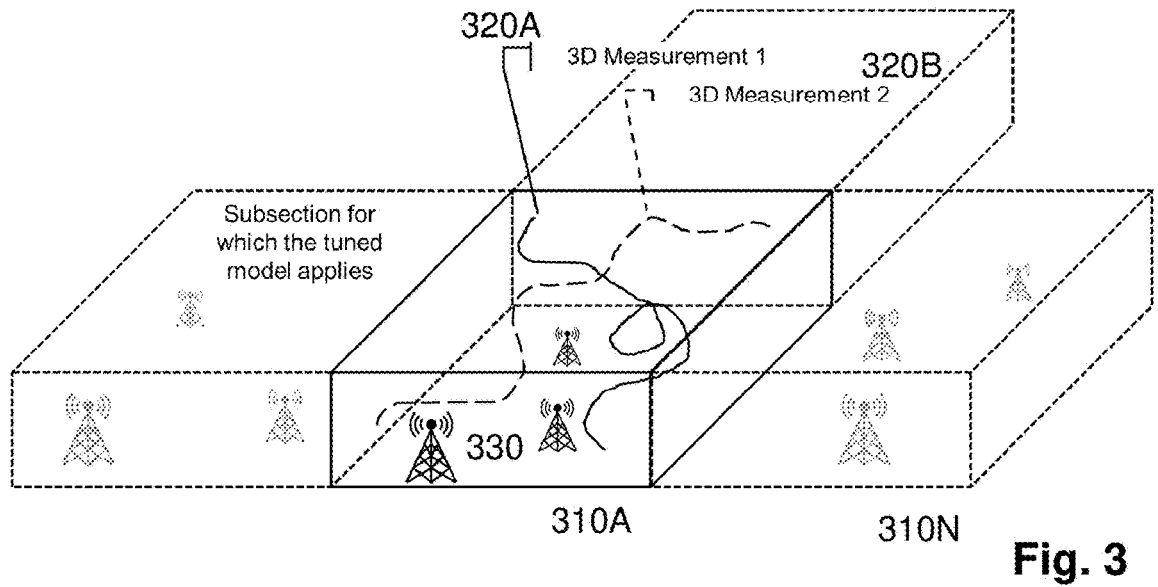
FIG. 3 is a graph showing a division of a flight area into sub-areas.

In some embodiments, the three-dimensional area is subdivided into a plurality of sub-areas (or subsections), and current 3D coverage data is computed respectively for the plurality of 3D sub-areas (or area elements) of the flight area. An example of a division of the flight area into sub-areas is shown in FIG. 3. As can be seen, the subsections may have a substantially cube or cuboid shape (seen in a flat map/projection of the earth surface). For instance, cuboid may have sizes of 10 km×10 km (horizontal directions)×500 m (vertical direction), although the disclosure is not limited to particular sizes of subsections, and larger or smaller subsections may be used as well. For instance.

Although not shown in FIG. 3, there may be one or more layers of cubes in vertical direction, such as a lower layer comprising takeoff and landing heights and a higher layer comprising travelling heights.

Furthermore, there may be a hierarchically layered division or partition of the flight area. For instance, a first layer of sub-areas may be "tiles" of 1° by 1° in longitude and latitude in WGS 84 coordinate system, which equals about 60 nautical miles in each direction at the equator. These tiles may then, as a second hierarchical layer of sub-areas, further be subdivided into subsections or "sub-tiles" (the size of which may be, e.g., the above-mentioned 10 km×10 km×500 m).

Stored and/or current data such as terrain/topography, land use and, or the availability of measured connectivity data from UAVs may be obtained by apparatus 100 respectively per sub-area. Moreover, the division into sub-areas may be made in accordance with the aforementioned data or other data. Accordingly, sub-areas where many measurements by UAVs have been recorded may achieve a greater degree of precision in the determination of 3D coverage data. Thus, a comparability of different sub-areas with respect to model quality (or data quality or prediction quality) is provided. For instance, in addition to the above-mentioned signal power and change probability of a network node the UAV is connected to, the quantity and/or quality of measured data per sub-area may be included in the 3D coverage data.

For instance, the computing of the current 3D coverage data may be performed based on a model for predicting 3D coverage, and the model may be generated based on the stored network data and automatically updated based on the current network data.

By automatically updating (or tuning) the model, the prediction or computation of the 3D coverage data is kept in line with a current coverage or connectivity state of the flight area. In order to represent a current status of the 3D network coverage in the flight area, data updates and, consequently, model updates, may be performed "real time" or whenever any change happens to the current network data, or whenever new measurement data such as a single new measured value or a file of measurement data, is available, to satisfy the requirements imposed by above-mentioned guiding operations such as air traffic control clearances for UAVs or control of UAVs. Accordingly, intervals between model updates may be fixed or variable.

In addition to the stored network data, the generation of the model may be based on the above-mentioned topological data. In addition, the current data provided to the model may include network data/connectivity data as well as the above-mentioned weather data. Moreover, new current values may be compared with historical values received under similar weather or network conditions, a plausibility of new values may thereby be tested. For instance, the model is updated by machine learning.

In the computing of the current 3D coverage data, one or more of the following exemplary computations may be performed, possibly using machine learning:

Interpolation between two measured values along a flight path of a UAV, in order to obtain a value of the same quality at a point (3D position) along the flight path where no measurement has been performed.

Interpolation of measured values of a quantity (e.g. signal power) between positions on two respective flight paths of two UAVs (see FIG. 3) may be performed, to obtain value of the same quantity for a point in an area surrounding the two flight paths.

Extrapolation from two or more measured values along a flight path of a UAV, in order to obtain a value along the expected flight path yet to come.

A new current data item or data point may be evaluated against previous data items or data points, in order to improve the robustness of the model. Thus, if a new update of current data is received, previous data values received earlier as past current data need not be discarded.

New current data values may be compared with historical values received under similar weather or network conditions, a plausibility of new values may thereby be tested.

Combining different data sources (possibly including unstructured and/or structured data and data having various degrees of structure), harmonizing, combining, and correlating the data, and computing analyses of network coverage.

Enriching historical input data by means of additional data points such that 3D subsections experience enhanced reliability and accuracy of the output (see FIG. 3).

Applying machine learning mechanisms such as supervised or unsupervised learning to train the modelling for continuous enhancements.

Utilizing the learnings from the subsections with many measurements available and applying the results to other subsections without measurements (see FIG. 3), whereas the applicability of the models from subsection 310A to another subsection 310N is derived from correlating and combining different input data such as terrain, vegetation and weather information in the respective subsection.

By combining different kinds of data and calculating models, predictions of 3D coverage and quality of connectivity can be computed and processed, which may facilitate estimation or assessment of risks of UAV air traffic. Accordingly, safety enhancements may be provided.

Moreover, continuous incorporation of measured data, e.g. data received from UAVs, and correlating the data with stored data and other network data may facilitate automatic calibration of a prediction model for 3D coverage and make models more robust.

Therein, the stored network data may include time varying historical connectivity data varying, which may be provided dependent on the time. This time dependency of the historical data may be considered for selecting historical values for comparing the current or new connectivity values with the stored connectivity values. For instance, a historical value or historical data may be considered which represents a connectivity at a given location in the flight area at the same time of the day and/or at the same day of the month, week, and/or year. For instance, the time varying historical data may include time varying data of at least one of signal strength, of interference, of population density such a number of communication terminals per area unit, historical traffic cell loads (such as a historical workload and/or the traffic transmitted/received at one or more of the network nodes, such as used resources out of the uplink and/or downlink resources available to the cell), and/or historical weather data, which may be correlated and/or compared with the corresponding current data.

Furthermore, machine learning may facilitate automatically making the model more precise when new current data is received and incorporated. Thus, a single new value such as an outlier can be prevented from unduly influencing the results of the model.

As mentioned above, a flight area may be divided into sub-areas, wherein a hierarchically layered partitioning may be applied. In the following, it is described with reference to FIG. 3 how such a subdivision of the flight area may be applied to model calibration or model tuning. For instance, the cuboids depicted in FIG. 3 as sub-areas may be the above-mentioned subsections of the WGS-84-1-by-1-sized tiles.

For instance, these tiles or the flight area may be divided into subsections or sub-areas for tuning, depending on where there are measurements available. If a new measurement is received, for instance in a measurement file, a 3D bounding rectangle or cuboid is generated around these measurements as a sub-area, and in this sub-area, the modelling specifically to these measurements. This very specific model is then applied to all the network nodes included in that bounding rectangle or cuboid. Hence, the modelling accuracy is enhanced in this sub-area for which the measurements have been obtained. In addition, the tuning with these measurements may also be applied for other regions in the flight area or the entire flight area. Accordingly, even in places or regions from where no measurements are available, the models are incrementally enhanced, but in the subsections or sub-areas where the measurements are actually performed, the accuracy will be greater.

Accordingly, model tuning, as disclosed, is applicable, for a given section or subsection of the flight area, with only a limited number of measurement values are currently available, but expected to grow in the future. Namely, in an incremental way, by automatic learning mechanisms, the models will get better, i.e. more accurate and more reliable, whenever a new measurement is performed and new measured data is obtained.

Applicable to all sites in the "tiles", and specifically the case in the sub-tiles (subsections).

An exemplary model for estimating coverage based on current and stored network data may include the following path loss and link budget equation (1) for determining a power of a signal at a receiver (e.g. a UAV on a flight path in the flight area) at a given location:

$$P_R = P_T + G(\varphi,\theta) - PL(d,h), \quad \text{equation (1)}$$

where $P_R$ is the power at the receiver (dBm, decibel-milliwatts);

$P_T$ is the (transmission) power of the transmitter/antenna/cell (dBm);

d is the distance between transmitter and receiver in meters;

h is the height above ground (flight height) of the UAV in meters;

$\varphi$ and $\theta$ are the relative azimuth and elevation (view angles) of the UAV, as seen from the cell (e.g. taking the mechanical tilt/antenna tilt and azimuth into account); and $G(\varphi,\theta)$ is the directivity (gain minus masking loss) of the cell/antenna; and PL(d,h) is the path loss.

For the determination/estimation of the path loss, a general model in accordance with the following equation (2) may be used:

$$PL(d,h) = (\alpha_1 + \alpha_2 \cdot \log(h)) \cdot \log(d) + \beta_1 + \beta_2 \cdot \log(h) \quad \text{equation (2).}$$

The coefficient $\alpha_2$ is negative (forced by constraints in the tuning process), so the path loss exponent $\alpha(h) = (\alpha_1 + \alpha_2 \log(h)) \cdot \log(d)$ is decreasing with increasing height. $\beta_2$ can be both positive and negative. In order to prevent the model coefficients dropping below the coefficients of a free space model at a given height $h_0$, for $h > h_0$, the coefficients are fixed with their value at $h_0$, $\alpha(h) = \alpha(h_0)$ and $\beta(h) = \beta(h_0)$ for $h \geq h_0$. This fixing of coefficients may prevent the model from underestimating the path loss at large heights.

For instance, the following coefficients from equation (3) are derived from tuning with UAV measurement data. They may be used in a default model, i.e. in an area where no measurement data is available as input into the system, for the frequency of 800 MHz:

$$PL(d,h) = (27.105 - 1.63149 \cdot \log(h)) \cdot \log(d) + 31.3353 + 0.735305 \cdot \log(h) \quad \text{equation (3).}$$

For other frequencies, frequency-correcting terms are applied to the constant coefficients $\alpha_1$, $\alpha_2$, $\beta_1$, and $\beta_2$ of the model.

Based on more measurement data available, and more advanced models being developed, additional coefficients and model components describing physical behavior may be added.

In case that measurement data is available in a specific subsection or sub-area of the 3D airspace, dedicated advanced algorithms and machine learning methods may be applied to automatically enhance the model by tuning it with the respective measurement data.

FIG. 3 shows an example where a 3D airspace is divided into subsection 310A to 310N. In subsection 310A radio signal measurements in 3D are available, 320A and 320B. The model within subsection 310A will now be tuned using measurement 320A. Then, this model will be applied to the network nodes 330, which are within the subsection 310A.

The subsection could also be adaptively formed around the first available measurement 320A, such that the subsection is defined by a bounding rectangle around the measurements.

With the availability of more measurements within subsection 310A, such as 320A and 320B, machine learning algorithms will enhance the tuning accuracy and reliability by means of Supervised Learning methods.

Supervised learning in this context is the machine learning task of learning the function that maps the measurement input data to the output of the tuned output modelling. It infers the model function from the labeled training data consisting of the measurement data and the output model. With each additional input data the algorithms analyze the historical training data together with the new data samples and produces an inferred function that will then be used for the processing of new examples.

For instance, measured values of a parameter such as a signal power are input into the machine learning process. As an output, a model of the signal power is provided, which is based on previously received stored data of the signal strength and updated with each newly received current measurement value or data item. Furthermore, constraints such as weather, current state or configuration of the network, or terrain may be input into the learning process.

In subsections where no measurement data is available, such as 310N, models will be applied to the respective network nodes within that subsection, which are based on a plurality of measurements available for other subsections, as exemplified above by equation 3, but not specific to the targeted 3D sub-area or subsection.

Figure 4:
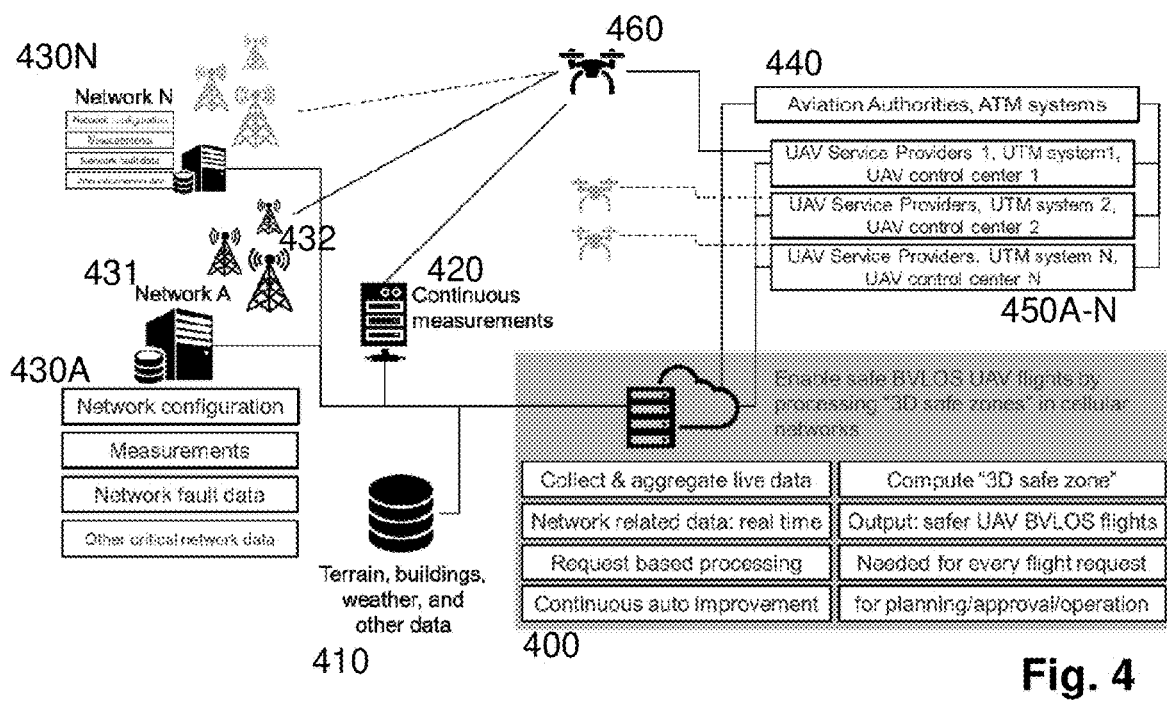
FIG. 4 is a block diagram showing a control system for UAV air traffic.

FIG. 4 shows an exemplary system for guiding UAVs, wherein the apparatus 100 is embodied by a computing node 400. Computing node 400 is connected, over a plurality of interfaces, to a plurality of networks (Network A . . . , network N) 430A-N respectively including a network server 431 and network nodes (base station including transmission/reception antennas) such as network node 432, an Aviation Authorities or ATM system as aviation control node 440, a plurality of UAV service providers 450A-N, a data server 410 or database server storing data, about terrain (topography), buildings, weather, and other data, as well as a data processing server 420, continuously or regularly receiving and forwarding (current) measurements (e.g. signal, channel measurements) from one or more UAVs (including UAV 460). In FIG. 4, computing node 400 is shown as a server of a cloud computing service.

As shown in FIG. 4, computing node 400 as an instance of apparatus 100 is directly connected to aviation control nodes 400, 450A-N which perform the guiding of the UAV or UAVs.

However, the present disclosure is not limited to the output interface being directly connected to the aviation control node. For instance, network-specific current coverage data may be transmitted to an intermediate data node such as a data hub which generates plural-network coverage data by combining network-specific coverage data of a plurality of communication networks.

Figure 5:
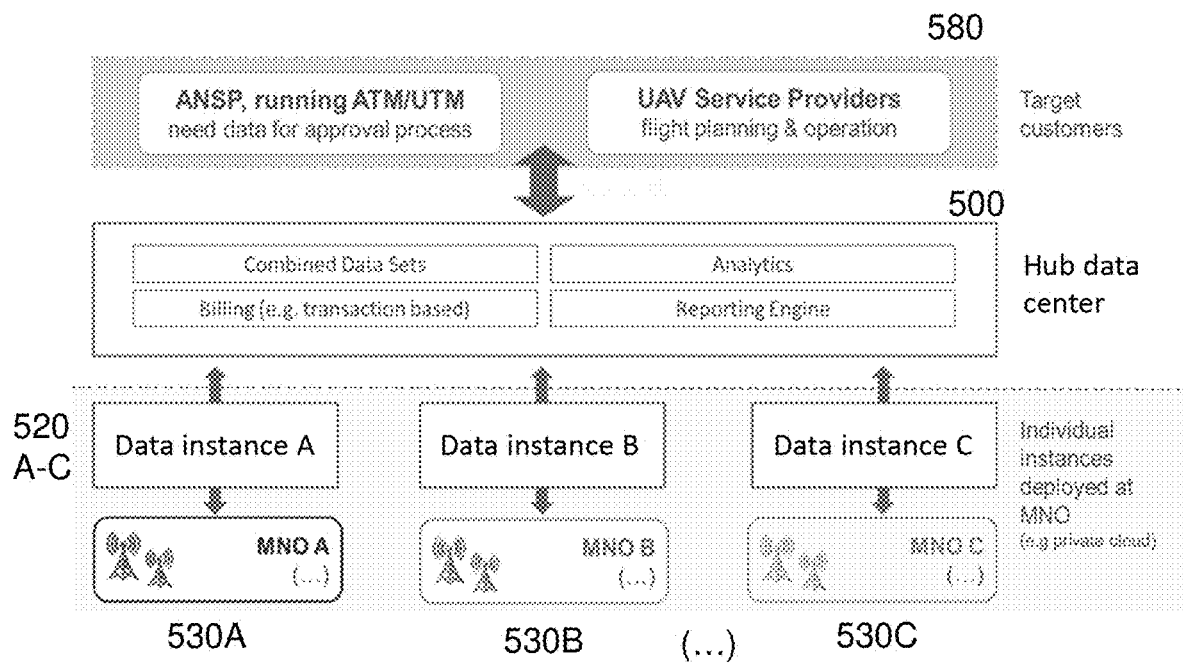
FIG. 5 is a block diagram showing a data processing system including individual data processing instances, a hub data center, and an air navigation service provider.

For instance, FIG. 5 shows apparatus 100 embodied by a plurality of data instances 520A-C deployed at a plurality of mobile network operators (MNOs) 530A-C. This disclosure is not limited to the number of MNOs being three as the Figure shows an example. Each of data instances 520A-C is connected to a data hub or hub data center 500 where the network-specific coverage data is combined or aggregated to generate plural-network coverage data. Hub data center 500 outputs combined plural-network coverage data to an aviation control node 580, such as an ANSP (air navigation service provider), ATM or UTM, or UAV service provider.

Accordingly, in this disclosure, "automatically reporting" of current 3D coverage data includes direct report reporting from apparatus 100 to the aviation control node as well as indirect reporting via an intermediate node such as a data hub which performs additional processing such as combining of respective network-specific coverage data.

The structure of nodes (e.g. servers) and connections/interfaces between nodes as shown in FIG. 4, as well as the usage and numbering of the term "interface" not used in a limiting manner in the present application. For instance, first interface 110 by which stored data is obtained may be an internal interface to a data storage comprised by apparatus 100, or an external interface to an external database. Moreover, the stored data may be regularly updated, for instance by new network information received from network operators and/or by feedback from the above-mentioned machine learning process.

The second interface 120 by which current data is obtained may comprise a plurality of physical or virtual interfaces to a plurality of data nodes from which different data (e.g. continuous measurements by UAVs, weather data, network data) are received. Likewise, the output interface may comprise a plurality of interfaces to one or more among aviation authorities, ATM systems, and one or more UAV service providers (UAV control centers/UTM systems).

In addition to the above-described apparatus and method for computing data for guiding an unmanned aerial vehicle, this disclosure provides an aviation control node and an aviation control method for guiding a UAV in a 3D area within airspace.

Figure 6:
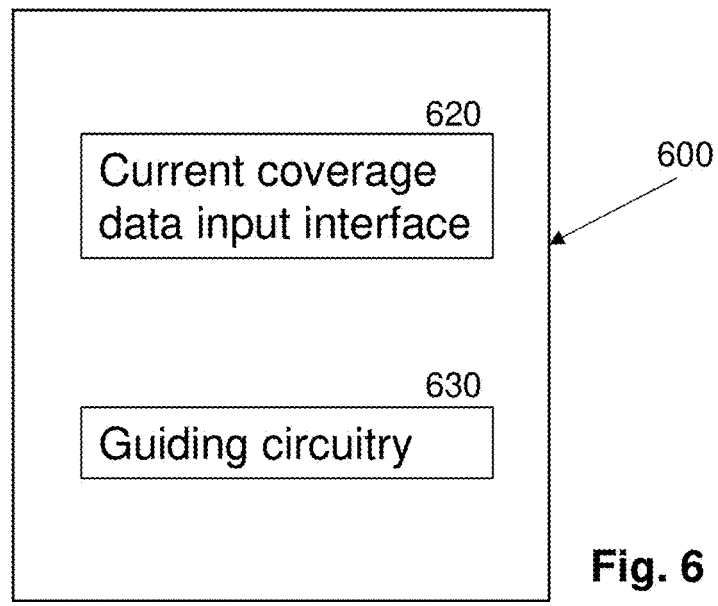
FIG. 6 is a block diagram showing an aviation control node.

Aviation control node 600, which is shown in FIG. 6, comprises an input interface configured for acquiring current 3D coverage data indicating current network coverage along three dimensions in the three-dimensional flight area, wherein the 3D coverage data is determined by correlating stored network data including location data of network nodes of a wireless communication network and current network data including current connectivity data of the network nodes.

Aviation control node 600 further comprises guiding circuitry 630 configured for performing the guiding of the UAV based on the current 3D coverage data.

Figure 7:
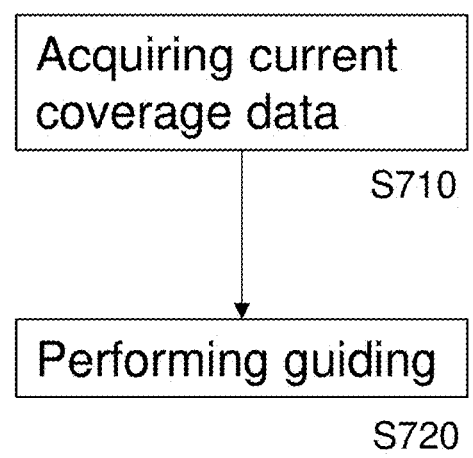
FIG. 7 is a flow chart showing an aviation control method.

Correspondingly, as shown in FIG. 7, the aviation control method comprises a step S710 of acquiring current 3D coverage data indicating current network coverage along three dimensions in the three-dimensional flight area, the 3D coverage data being determined by correlating stored network data including location data of network nodes of a wireless communication network and current network data including current connectivity data of the network nodes.

3D coverage data may be computed or determined by aviation control node 600 or by a computing node such as apparatus 100 or hub data center 500.

Further, the aviation control method comprises a step S720 of performing the guiding of the UAV based on the current 3D coverage data.

For instance, in the case of guiding UAVs, the guiding node 600 may correspond to a computing node at an ANSP, aviation authority, UAV service provider or UTM system, such as aviation authorities/ATM systems 440 and UAV service providers/UTM systems 450A-N shown in FIG. 4 or aviation control node 580 shown in FIG. 4. "Guiding UAVs" corresponds to the usage of this term in the above description. Guiding also comprises providing data for guiding.

Moreover, the term "interface" refers to an input and/or output processing structure which may include one or more protocol layers defining in which format the data are received or transmitted and how the data are to be interpreted. Such interface may be wired or wireless.

It should be further noted that "UAV" generally refers to aerial vehicles which are not controlled by an on-board pilot. However, a UAV may for example carry cargo, optical or other measurement equipment (e.g. a camera), as well as passengers (e.g. an air taxi). Summarizing, the present disclosure provides an apparatus and a method for computing data for guiding unmanned aerial vehicles (UAVs) in a three-dimensional (3D) air space. Stored network data including location data of network nodes as well as current network data including current connectivity data of the network nodes are acquired. By correlating the stored and current network data, current 3D coverage data indicating current network coverage along three dimensions in the 3D flight area (e.g. a handover probability or an interference caused by a UAV) are determined. The techniques of the present disclosure enable modeling and predicting a current coverage and connectivity state of 3D air space and facilitates control and operation of UAV air traffic.

The invention claimed is:

1. An apparatus for computing data for guiding an unmanned aerial vehicle (UAV) in a three-dimensional (3D) flight area within airspace, comprising:
    a first interface configured for acquiring, from a data storage, stored network data including location data of network nodes of a wireless communication network within the flight area;
    a second interface configured for acquiring current network data including current connectivity data of the network nodes; and
    circuitry configured for computing current 3D coverage data indicating current network coverage along three dimensions in the 3D flight area by correlating the stored network data and the current network data,
    wherein the current 3D coverage data includes an indication of a handover probability of handover by the UAV from one network node to another network node, the handover probability depends on a moving direction of the UAV, and the handover probability comprises a change probability that the UAV will switch connections from the one network node to the another network node.

2. The apparatus according to claim 1, further comprising an output interface configured for automatically reporting the current 3D coverage data to an aviation control node for granting an air traffic control clearance for the UAV in the flight area or for performing control of the UAV.

3. The apparatus according to claim 1, wherein the second interface is configured for receiving event data indicating planned future network events known to occur at the network nodes at a time later than receiving the event data.

4. The apparatus according to claim 1, wherein the current connectivity data includes at least one of:
    a current state of a network node out of an ON state and an OFF state;
    fault network data, or
    a workload indicating at least one of: a number of mobile terminals currently connected to one or more of the network nodes, or the traffic transmitted or received at one or more of the network nodes, and
    wherein guiding of the UAV includes deviating from a previously determined flight path based on a change in network connectivity indicated by the current connectivity data.

5. The apparatus according to claim 1, wherein the current network data includes results of connectivity measurements performed by the UAV or a communication terminal different from the UAV.

6. The apparatus according to claim 5, wherein the circuitry is configured for calculating a position of the UAV based on the results of the connectivity measurements performed by the UAV or based on a connectivity measurement of the connectivity of the UAV performed by the network.

7. The apparatus according to claim 1, wherein the current 3D coverage data indicate an interference caused by the UAV.

8. The apparatus according to claim 2, wherein the current network data includes an indication of a current number, or an aggregated number over a period of time, of communication terminals per area unit, and the output interface reports that number of communication terminals per area to the aviation control node.

9. The apparatus according to claim 1, wherein the current 3D coverage data includes a signal power.

10. The apparatus according to claim 9, wherein the handover probability depends on a moving speed of the UAV.

11. The apparatus according to claim 1, wherein the stored network data and the current network data includes data of a plurality of wireless communication networks.

12. The apparatus according to claim 1, wherein the 3D flight area is subdivided into a plurality of sub-areas, and the circuitry is configured for computing the current 3D coverage data respectively for the plurality of sub-areas.

13. The apparatus according to claim 1, wherein the circuitry is configured for computing the current 3D coverage data based on a model for predicting 3D coverage, and the model is generated based on the stored network data and automatically updated based on the current network data.

14. The apparatus according to claim 13, wherein the model is updated by machine learning.

15. An aviation control node for guiding an unmanned aerial vehicle (UAV) in a three-dimensional (3D) flight area within airspace, comprising:
    an input interface configured for acquiring current 3D coverage data indicating current network coverage along three dimensions in the 3D flight area, the 3D coverage data being determined by correlating stored network data including location data of network nodes of a wireless communication network within the flight area and current network data including current connectivity data of the network nodes; and circuitry configured for performing the guiding of the UAV based on the current 3D coverage data,
wherein the current 3D coverage data includes an indication of a handover probability of handover by the UAV from one network node to another network node, the handover probability depends on a moving direction of the UAV, and the handover probability comprises a change probability that the UAV will switch connections from the one network node to the another network node.

16. The aviation control node according to claim 15, wherein guiding of the UAV includes determining at least one of a flight path or a flight corridor including the flight path by minimizing a cost function including at least one of a signal power, a handover probability, and an interference caused by the UAV.

17. A method for computing data for guiding unmanned aerial vehicles (UAVs) in a three-dimensional (3D) flight area within airspace, comprising:
acquiring, from a data storage, stored network data including location data of network nodes of a wireless communication network within the flight area;
acquiring current network data including current connectivity data of the network nodes; and
computing current 3D coverage data indicating current network coverage along three dimensions in the 3D flight area by correlating the stored network data and the current network data,
wherein the current 3D coverage data includes an indication of a handover probability of handover by the UAV from one network node to another network node, the handover probability depends on a moving direction of the UAV, and the handover probability comprises a change probability that the UAV will switch connections from the one network node to the another network node.

18. An aviation control method for guiding an unmanned aerial vehicle (UAV) in a three-dimensional (3D) flight area within airspace, comprising:
acquiring current 3D coverage data indicating current network coverage along three dimensions in the 3D flight area, the 3D coverage data being determined by correlating stored network data including location data of network nodes of a wireless communication network within the flight area and current network data including current connectivity data of the network nodes; and
performing the guiding of the UAV based on the current 3D coverage data,
wherein the current 3D coverage data includes an indication of a handover probability of handover by the UAV from one network node to another network node, the handover probability depends on a moving direction of the UAV, and the handover probability comprises a change probability that the UAV will switch connections from the one network node to the another network node.

19. A method for computing data for guiding unmanned aerial vehicles (UAVs) in a three-dimensional (3D) flight area within airspace, comprising:
acquiring, from a data storage, stored network data including location data of network nodes of a wireless communication network within the flight area;
acquiring current network data including current connectivity data of the network nodes; and
computing current 3D coverage data indicating current network coverage along three dimensions in the 3D flight area by correlating the stored network data and the current network data, the 3D coverage data including an interference caused by the UAV,
wherein the current network data includes an indication of a current number, or an aggregated number over a period of time, of communication terminals per area unit, an output interface reports the current number or the aggregated number of communication terminals per area unit to an aviation control node, and the current number or the aggregated number of communication terminals per area unit is determined by computing or collecting positions of communication terminals in the wireless communication network.

20. An aviation control method for guiding an unmanned aerial vehicle (UAV) in a three-dimensional (3D) flight area within airspace, comprising:
acquiring current 3D coverage data indicating current network coverage along three dimensions in the 3D flight area, the 3D coverage data being determined by correlating stored network data including location data of network nodes of a wireless communication network within the flight area and current network data including current connectivity data of the network nodes; and
performing the guiding of the UAV based on the current 3D coverage data, wherein the guiding of the UAV includes determining at least one of a flight path or a flight corridor including the flight path by minimizing a cost function including at least an interference caused by the UAV,
wherein the current network data includes an indication of a current number, or an aggregated number over a period of time, of communication terminals per area unit, an output interface reports the current number or the aggregated number of communication terminals per area unit to an aviation control node, and the current number or the aggregated number of communication terminals per area unit is determined by computing or collecting positions of communication terminals in the wireless communication network.

* * * * *